(12) United States Patent
Kawakami

(10) Patent No.: US 8,074,235 B2
(45) Date of Patent: Dec. 6, 2011

(54) CONTROL METHOD FOR A MEDIA TRANSPORTATION MECHANISM, AND A MEDIA PROCESSING DEVICE

(75) Inventor: Hideki Kawakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 817 days.

(21) Appl. No.: 12/142,382

(22) Filed: Jun. 19, 2008

(65) Prior Publication Data

US 2008/0316874 A1    Dec. 25, 2008

(30) Foreign Application Priority Data

Jun. 19, 2007    (JP) .................................. 2007-161756

(51) Int. Cl.
*G11B 17/04*    (2006.01)
*G11B 21/08*    (2006.01)

(52) U.S. Cl. ..................................... 720/619; 369/30.85

(58) Field of Classification Search .................. 720/619, 720/623, 624, 610, 632, 615, 608, 607; 369/30.78, 369/30.69, 30.87, 30.9, 30.34, 30.81, 30.77, 369/30.92

See application file for complete search history.

(56) References Cited

U.S. PATENT DOCUMENTS

| | | | |
|---|---|---|---|
| 6,481,093 B1 * | 11/2002 | Ruden et al. | 29/603.03 |
| 7,954,118 B2 * | 5/2011 | Douglass et al. | 720/621 |
| 2007/0280057 A1 | 12/2007 | Ikeda | |
| 2008/0105142 A1 * | 5/2008 | Ichikawa et al. | 101/35 |
| 2010/0072689 A1 * | 3/2010 | Toshima et al. | 271/3.14 |

FOREIGN PATENT DOCUMENTS

| | | |
|---|---|---|
| JP | 60083252 | 5/1985 |
| JP | 2006202379 | 8/2006 |

* cited by examiner

*Primary Examiner* — Allen Cao

(57) ABSTRACT

A media transportation mechanism control method and a media processing device can accurately detect the last disc or other media stored in a media storage unit. A transportation arm 36 is lowered to the media stacker 21, the transportation arm 36 is paused when the media detection mechanism 200 detects the media, and the transportation arm 36 is then raised and the position where the media detection mechanism 200 stops detecting the media is stored as media height H. After the transportation arm 36 descends again, picks a disc M from the media stacker 21, and then rises, the media height H is compared with a prescribed threshold limit α. If the media height H is less than the threshold limit α, the number of media left in the media stacker 21 is determined to be a prescribed count (such as zero).

18 Claims, 19 Drawing Sheets

CONTROL METHOD FOR A MEDIA TRANSPORTATION MECHANISM, AND A MEDIA PROCESSING DEVICE

CROSS-REFERENCE TO RELATED APPLICATIONS

Japanese Patent application No. 2007-161756 is hereby incorporated by reference in its entirety.

BACKGROUND

Field of Invention

The present invention relates to a control method for a media transportation mechanism that transports media such as CDs and DVDs, and to a media processing device for processing information on the media transported by the media transportation mechanism.

DESCRIPTION OF RELATED ART

Media processing devices such as disc duplicators that write data to large numbers of CDs (Compact Disc), DVDs (Digital Versatile Disc), and other data recording media (also referred to as simply "media" or "discs" below), and CD/DVD publishers that both write the data and print a label to produce finished media, are now widely available. Such media processing devices generally have media storage unit for holding a stack of disc-shaped media, a drive for writing data to the media, a printer for printing on the label side of the media, and a media transportation mechanism for gripping and conveying the media to the drive and printer. See, for example, Japanese Unexamined Patent Appl. Pub. JP-A-2006-202379.

As the unused blank media stored stacked in the media storage unit are removed by the transportation arm of the media transportation mechanism, written, and printed one after the other, the supply of blank media in the media storage unit gradually decreases. If the supply of media stored in the media storage unit is depleted, the media storage unit must be replenished with more blank media. In order to eliminate wasting time and enable media processing to proceed efficiently, the user is preferably prompted to add media before all of the media in the media storage unit are consumed, or more particularly before the last disc is processed.

SUMMARY OF INVENTION

A control method for a media transportation mechanism and media processing device according to the present invention enables accurately detecting the last disc stored in the media storage unit.

A first aspect of the invention is a control method for a media transportation mechanism having a transportation arm that can grip media stacked in a media storage unit and can move vertically (a more generally, linearly), and a media detection mechanism that is positioned near the transportation arm and can detect if media is present, the control method having steps of: lowering the transportation arm to the media storage unit; pausing the transportation arm when the media detection mechanism detects media; storing as the media height the position where the media detection mechanism stops detecting the media when the transportation arm rises; lowering the transportation arm again, gripping the media in the media storage unit, and then raising the transportation arm; and comparing the media height with a prescribed height threshold limit, and determining that the number of media remaining in the media storage unit is a prescribed number if the media height is less than the threshold limit height.

Preferably, the prescribed number of media is zero.

By thus lowering the transportation arm to the media storage unit, pausing the transportation arm when the media detection mechanism positioned near the transportation arm detects media, and storing as the media height the position where the media detection mechanism stops detecting the media when the transportation arm is then raised, the media height can be accurately detected. It is difficult to reduce the speed of the transportation arm on the descent because of the long distance traveled and the need for efficiency. Therefore, while measuring the height of the media at the descent speed of the transportation arm when lowering the transportation arm to pick up a disc is susceptible to error, the media height can be accurately measured by raising the transportation arm just the thickness of the media after pausing the transportation arm when media is detected on the down stroke.

By then comparing the stored media height with a prescribed media height threshold limit after picking and lifting a disc by means of the transportation arm, the disc picked by the transportation arm can be determined to be the last of the media in the stack if the media height is less than the threshold limit height, and the number of media left in the media storage unit can be accurately determined to be a certain count, such as zero. The user can then be informed that there are zero media left in the media storage unit, the user can add more media to the media storage unit before the supply is completely consumed, time wasted idling when processing media can be eliminated, and the media can be processed efficiently.

Another aspect of the invention is a control method for a media transportation mechanism having a transportation arm that can grip media stacked in a media storage unit and can move vertically, and a media detection mechanism that is positioned near the transportation arm and can detect if media is present, having steps of: lowering the transportation arm to the media storage unit; pausing the transportation arm when the media detection mechanism detects media; storing as the media height the position where the media detection mechanism stops detecting the media when the transportation arm rises; and comparing the media height with a prescribed height threshold limit, and determining that the number of media remaining in the media storage unit is one if the media height is less than the threshold limit height.

By thus lowering the transportation arm to the media storage unit, pausing the transportation arm when the media detection mechanism positioned near the transportation arm detects media, and storing as the media height the position where the media detection mechanism stops detecting the media when the transportation arm is then raised, the media height can be accurately detected. It is difficult to reduce the speed of the transportation arm on the descent because of the long distance traveled and the need for efficiency. Therefore, while measuring the height of the media at the descent speed of the transportation arm when lowering the transportation arm to pick up a disc is susceptible to error, the media height can be accurately measured by raising the transportation arm just the thickness of the media after pausing the transportation arm when media is detected on the down stroke.

By then comparing the stored media height with a prescribed media height threshold limit, the disc to be picked by the transportation arm can be determined to be the last of the media in the stack if the media height is less than the threshold limit height, and the number of media left in the media storage unit can be accurately determined to be one. The user can then be informed that the supply of media in the media storage unit will soon be depleted before the supply is completely consumed, time wasted idling when processing media can therefore be eliminated, and the media can be processed efficiently.

Further preferably, the threshold limit is set using a value that is less than the thickness of two of the thinnest usable media and is greater than the thickness of one of the thickest usable media.

This aspect of the invention enables accurately detecting the last piece of media even when the media thickness varies due to deviations in the thickness of the used media.

Yet further preferably, the media transportation mechanism control method also has steps of storing as a provisional media height the position where the media detection mechanism detects the media when the transportation arm descends in the media storage unit, and making a near-end decision for the number of remaining media stored in the media storage unit based on the provisional media height; and if the near-end decision determines the media supply is near the end, storing as the media height the position where the media detection mechanism stops detecting media as the transportation arm rises from the position where the media detection mechanism detected the media, and determining the number of remaining media by comparing this media height with the threshold limit.

The control method according to this aspect of the invention uses the media height detected when the transportation arm descends as a provisional media height that is an approximate height, and makes a near-end determination using this approximate media height. If the stack is near the end (the near-end detection is true), the transportation arm is raised and the position where the media detection mechanism stops detecting the media is stored as the true media height that is used to determine if the detected media is the last disc or other media in the stack. If the near-end detection is false, the process of determining if the detected media is the last one is omitted and the transportation process continues at the normal speed. Whether the detected media is the last one is determined with precision only if the near-end is detected, and slowing the normal processing speed is therefore unnecessary.

Note that a near-end state as used herein indicates when the number of remaining media is almost one. The media height when there are two or three discs or other media remaining can therefore be used as the near-end detection limit for detecting the near-end state.

Another aspect of the invention is a media processing device having a media storage unit that stores media in a stack; a media processing unit that processes the media; a media transportation mechanism that has a media detection mechanism for detecting if media is present, and a transportation arm that can hold the media and travel vertically, and carries media from the media storage unit to the media processing unit by moving the transportation arm; and a control unit that lowers the transportation arm to the media storage unit, pauses the transportation arm when the media detection mechanism detects media, stores as the media height the position where the media detection mechanism stops detecting the media when the transportation arm rises, lowers the transportation arm again, grips the media in the media storage unit, and then raises the transportation arm, and compares the media height with a prescribed height threshold limit, and determining that the number of media remaining in the media storage unit is a prescribed number if the media height is less than the threshold limit height.

In the media processing device according to this aspect of the invention the prescribed number of media is zero.

When this media processing device moves media from the media storage unit to the media processing unit, the media height can be accurately detected by lowering the transportation arm to the media storage unit, pausing the transportation arm when the media detection mechanism detects media, and storing as the media height the position where the media detection mechanism stops detecting the media when the transportation arm is then raised. It is difficult to reduce the speed of the transportation arm on the descent because of the long distance traveled and the need for efficiency. Therefore, while measuring the height of the media at the descent speed of the transportation arm when lowering the transportation arm to pick up a disc is susceptible to error, the media height can be accurately measured by raising the transportation arm just the thickness of the media after pausing the transportation arm when media is detected on the down stroke.

By then comparing the stored media height with a prescribed media height threshold limit after picking and lifting a disc by means of the transportation arm, the disc picked by the transportation arm can be determined to be the last of the media in the stack if the media height is less than the threshold limit height, and the number of media left in the media storage unit can be accurately determined to be a certain count, such as zero. The user can then be informed that there are zero media left in the media storage unit, the user can add more media to the media storage unit before the supply is completely consumed, time wasted idling when processing media can be eliminated, and the media can be processed efficiently.

Another aspect of the invention is a media processing device having a media storage unit that stores media in a stack; a media processing unit that processes the media; a media transportation mechanism that has a media detection mechanism for detecting if media is present, and a transportation arm that can hold the media and travel vertically, and carries media from the media storage unit to the media processing unit by moving the transportation arm; and a control unit that lowers the transportation arm to the media storage unit, pauses the transportation arm when the media detection mechanism detects media, stores as the media height the position where the media detection mechanism stops detecting the media when the transportation arm rises, and compares the media height with a prescribed height threshold limit and determines that the number of media remaining in the media storage unit is one if the media height is less than the threshold limit height.

When this media processing device moves media from the media storage unit to the media processing unit, the media height can be accurately detected by lowering the transportation arm to the media storage unit, pausing the transportation arm when the media detection mechanism positioned near the transportation arm detects media, and storing as the media height the position where the media detection mechanism stops detecting the media when the transportation arm is then raised. It is difficult to reduce the speed of the transportation arm on the descent because of the long distance traveled and the need for efficiency. Therefore, while measuring the height of the media at the descent speed of the transportation arm when lowering the transportation arm to pick up a disc is susceptible to error, the media height can be accurately measured by raising the transportation arm just the thickness of the media after pausing the transportation arm when media is detected on the down stroke.

By then comparing the stored media height with a prescribed media height threshold limit, the disc to be picked by the transportation arm can be determined to be the last of the media in the stack if the media height is less than the threshold limit height, and the number of media left in the media storage unit can be accurately determined to be one. The user can then be informed that the supply of media in the media storage unit will soon be depleted before the supply is completely consumed, time wasted idling when processing media can therefore be eliminated, and the media can be processed efficiently.

In a media processing device according to another aspect of the invention the media detection mechanism has a detection lever that is supported freely movably on the transportation arm, and comprises a detection probe that can contact the media and can move between a media-not-detected position protruding to the media holding side from the transportation arm, and a media-detected position where the probe protrudes less than in the media-not-detected position, and a detector that detects displacement of the detection lever to the media-detected position.

With the media processing device according to this aspect of the invention the position where the detection lever is displaced from one of the media-detected and media-not-detected positions to the other when the transportation arm moves can be measured as the media height, the height of the bottom of the media storage unit and the media height can be determined referenced to the position of the transportation arm, and the process for determining the last disc or other media in the stack can be simplified.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a media processing device and a control method for the media processing device according to the present invention is described below with reference to the accompanying figures.

The media processing device of the invention is described below using a disc publisher by way of example.

Figure 1:
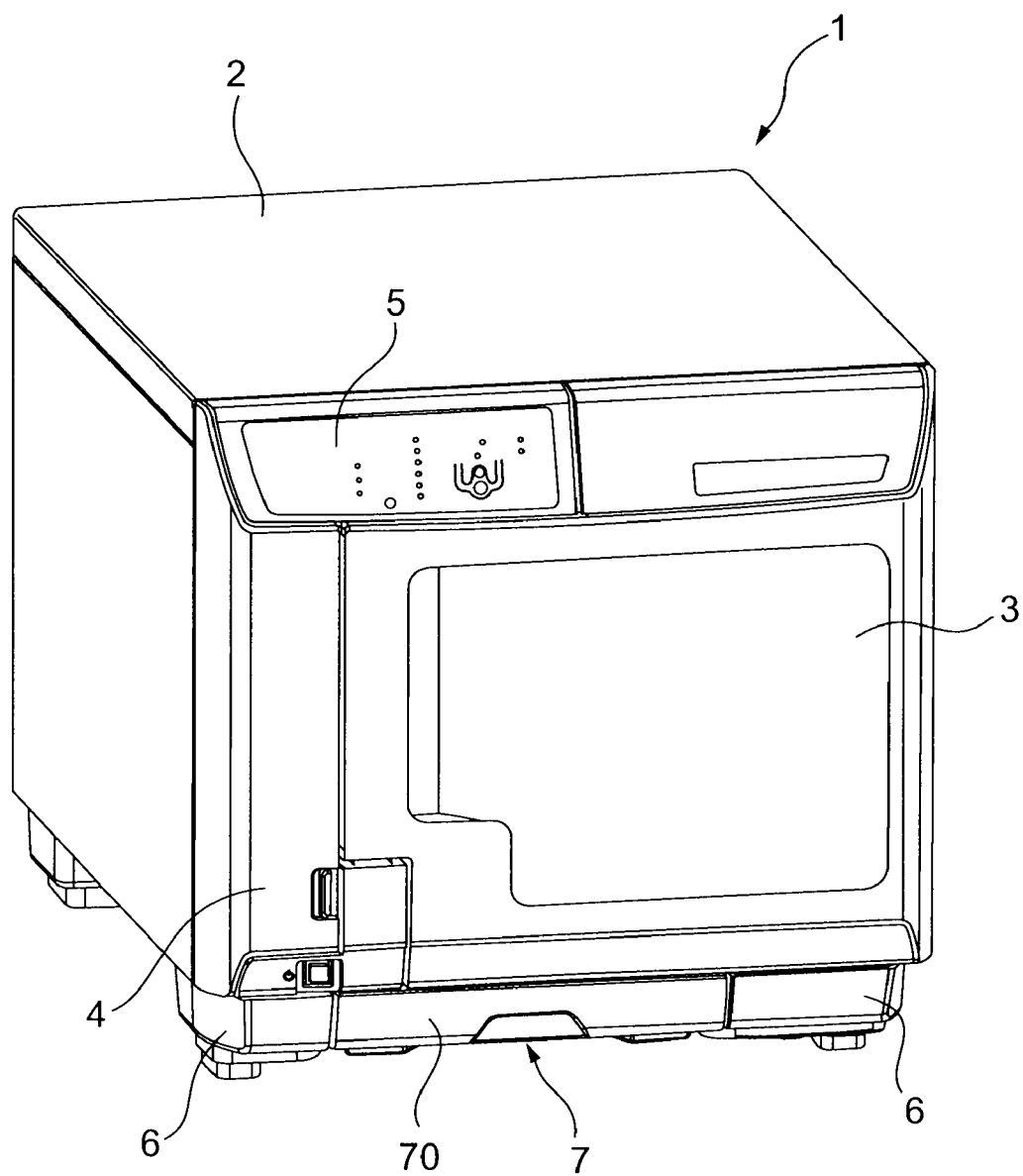
FIG. 1 is an external oblique view of a media publisher (media processing device).
Figure 2:
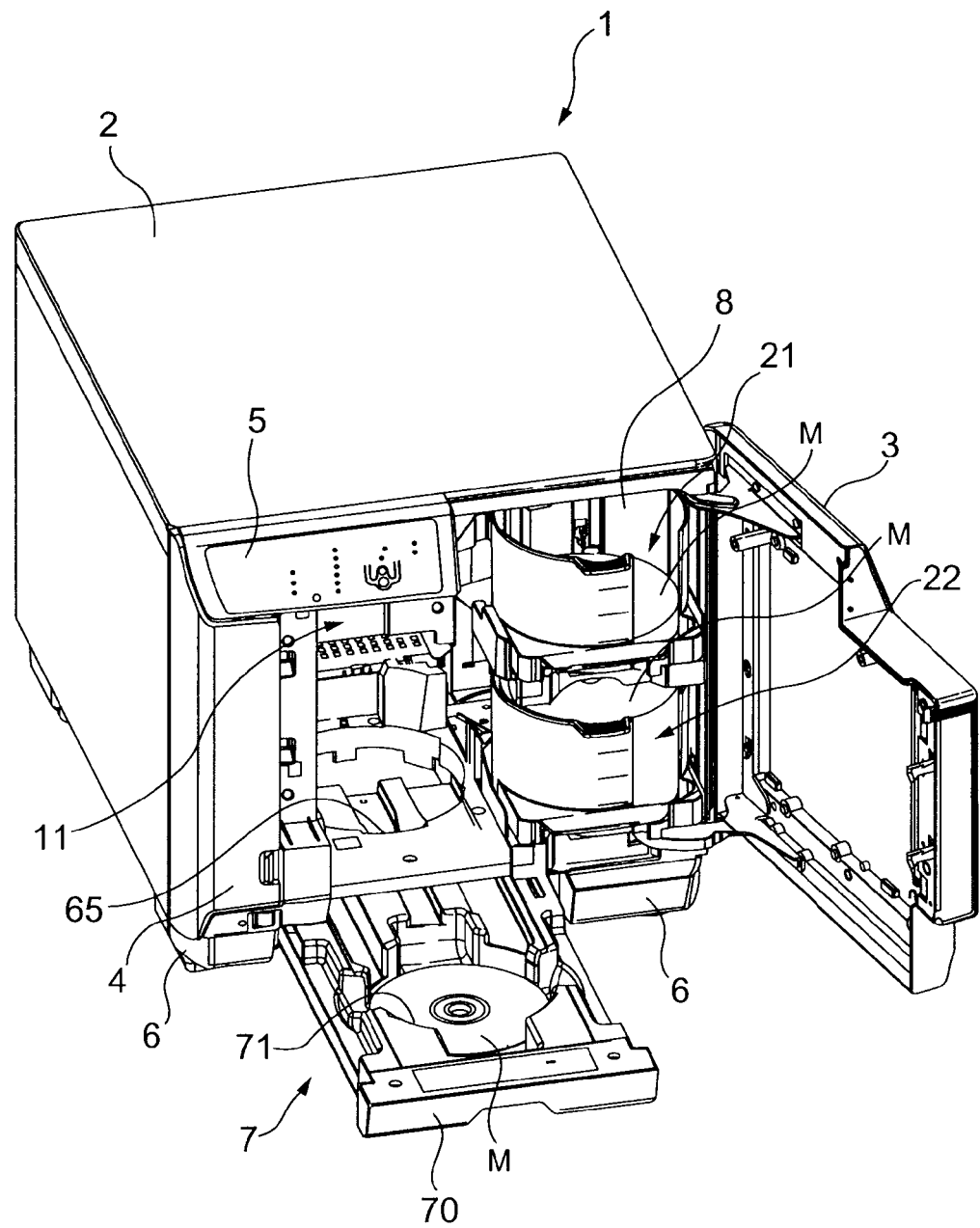
FIG. 2 is an external oblique view of the publisher with the access doors and disc tray open.
Figure 3:
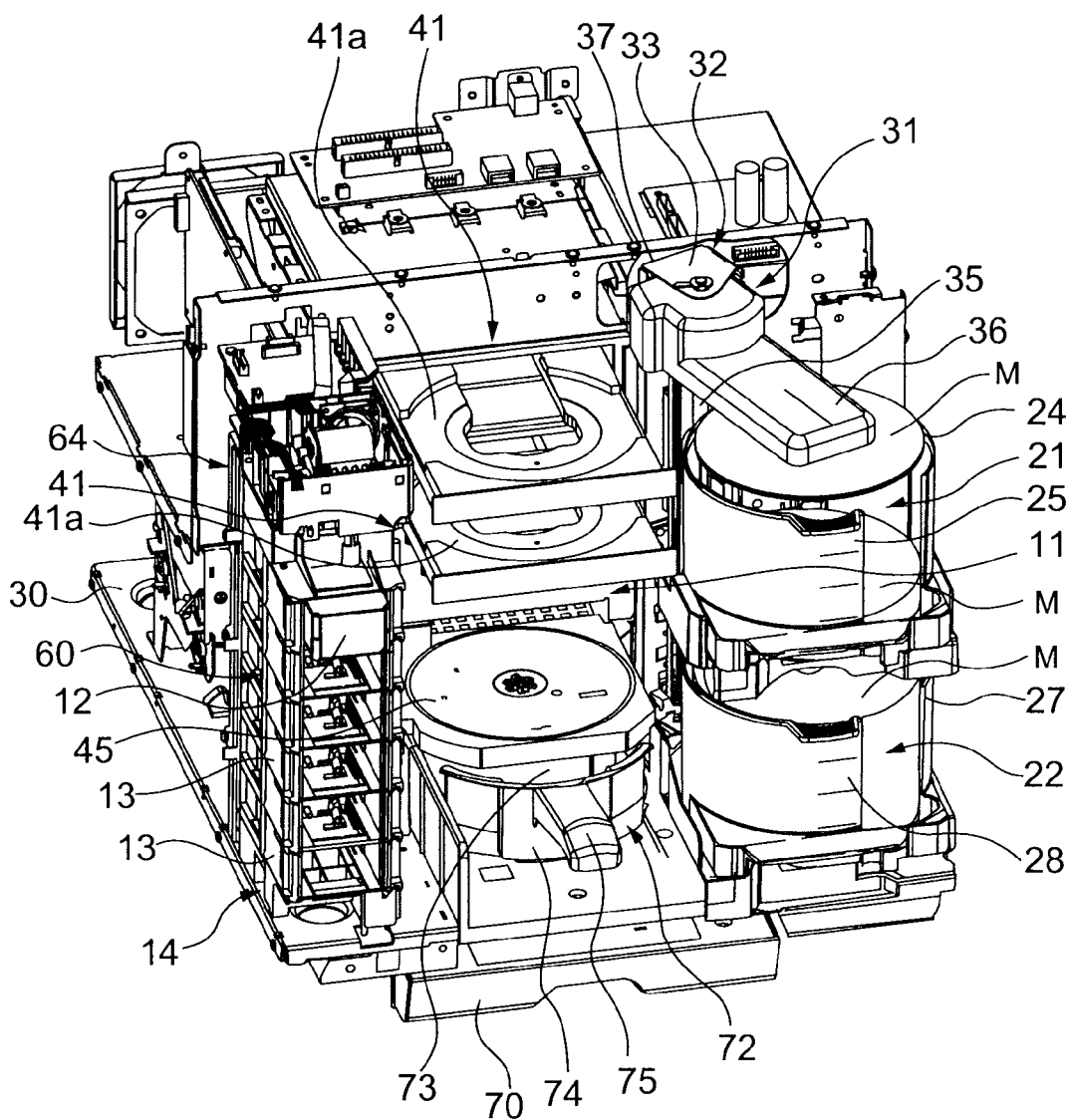
FIG. 3 is an oblique view from the top front side of the publisher with the case removed.
Figure 4:
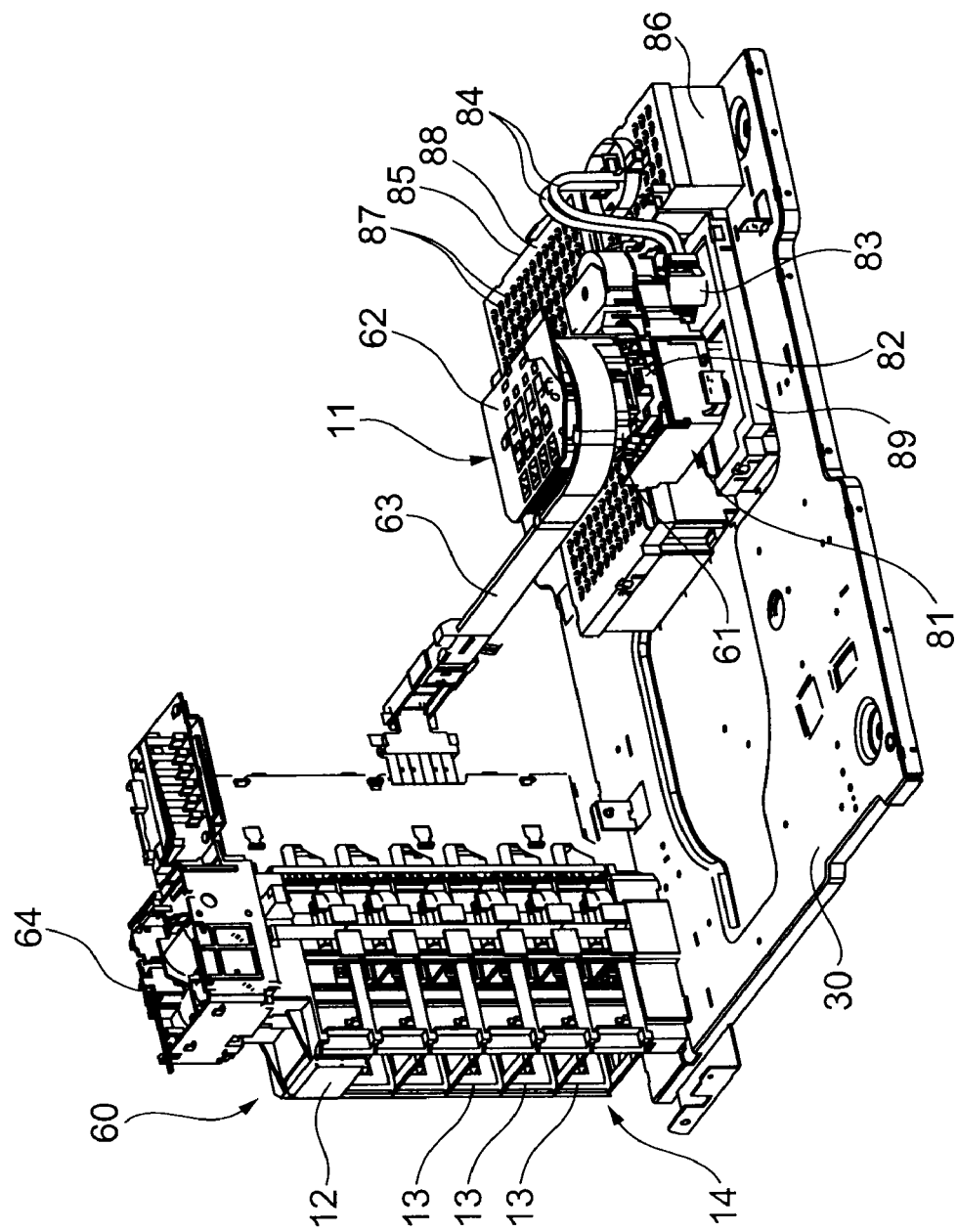
FIG. 4 is an oblique view of the label printer assembly incorporated in the publisher.

FIG. 1 is an external oblique view of the publisher (media processing device) when all units are closed. FIG. 2 is an external oblique view of the publisher with the access doors and disc tray open. FIG. 3 is an oblique view from the top front side of the publisher with the case removed. FIG. 4 is an oblique view of the label printer assembly incorporated in the publisher.

As shown in FIG. 1, the publisher 1 is a media processing device that writes data and prints on the label side of disc-shaped media (data recording media) such as CDs and DVDs, and has a basically box-shaped case 2. Doors 3 and 4 that open and close to the right and left are attached at the front of the case 2. An operating panel 5 having various indicators and operating buttons is located at the top left part of the case 2, and support legs 6 project down from the bottom of the case 2 on both right and left sides. A drawer mechanism 7 is located between the right and left legs 6.

As shown in FIG. 2, the access door 3 on the front right side opens and closes for access to an open area 8 at the front of the publisher 1, and is a door that opens and closes for loading unused (blank) media M and removing finished media M from the open area 8.

The access door 4 on the front left side opens and closes for replacing the ink cartridges 12 of the label printer 11 shown in FIG. 3. When the door 4 is open, a cartridge carrier unit 14 with a plurality of cartridge holders 13 arrayed in a vertical stack is exposed.

As shown in FIG. 2 and FIG. 3, a media stacker 21 (media storage unit) for holding a plurality of unused blank discs M (such as 50) to which data has not been written in a vertical stack, and another media stacker 22 (media storage unit) for similarly holding a plurality of completed discs M or blank discs M (such as 50) are located inside the case 2 of the publisher 1. Media stacker 21 and media stacker 22 are positioned one above the other so that the media M are stored coaxially in the stackers. Both media stacker 21 and media stacker 22 can be freely installed to and removed from predetermined positions.

The top media stacker 21 has a pair of right and left curved side walls 24 and 25. The blank discs M are placed from the top into the blank media stacker 21 between the side walls 24 and 25, which hold the discs in a substantially coaxial stack. The task of storing or adding the blank discs M to the blank media stacker 21 can be done easily by opening the door 3 and pulling the media stacker 21 out.

The bottom media stacker 22 is identically constructed with a pair of right and left curved side walls 27 and 28, enabling the discs M to be inserted from the top and stored in a substantially coaxial stack.

As shown in FIG. 3, a media transportation mechanism 31 is located behind the media stackers 21 and 22. The media transportation mechanism 31 has a vertical guide shaft 35 positioned between the main frame 30 and the top plate 33 of the chassis 32. A transportation arm 36 is supported so that it can move up and down and rotate on the vertical guide shaft 35. The transportation arm 36 can move vertically up and down along the vertical guide shaft 35 and can pivot right and left on the vertical guide shaft 35 by means of a drive motor 37.

Two media drives 41 are located one above the other at the back beside the two stackers 21 and 22 and the media transportation mechanism 31, and the carriage 62 (described below) of the label printer 11 is positioned so that it can move below the media drives 41.

Each of the media drives 41 has a media tray 41a, which can move between a data writing position where data is recorded to the media M, and a media transfer position where the media M can be loaded and unloaded from the media tray 41a.

The label printer 11 also has a media tray 45 that can move between a printing position for printing a label on the label side of the media M, and a media transfer position where the media can be loaded and unloaded from the media tray 45.

FIG. 3 shows the media trays 41a of the top and bottom media drives 41 pulled out to the media transfer position, and the media tray 45 of the label printer 11 at the media transfer position.

The label printer 11 in this example is an inkjet printer that uses color ink cartridges 12 (for six colors, specifically, black, cyan, magenta, yellow, light cyan, and light magenta) as the ink supply mechanism 60. The ink cartridges 12 are installed from the front to the individual cartridge holders 13 of the cartridge carrier unit 14.

A space enabling the transportation arm 36 of the media transportation mechanism 31 to move up and down is formed between the pair of right and left side walls 24 and 25 of the one media stacker 21 and between the pair of right and left side walls 27 and 28 of the other media stacker 22. A space is also formed between the top and bottom media stackers 21 and 22 so that the transportation arm 36 of the media transportation mechanism 31 can pivot horizontally for positioning directly above the bottom media stacker 22. When media trays 41a are pushed into the media drives 41, the transportation arm 36 of the media transportation mechanism 31 descends and can access the media tray 45 of the label printer 11 at the media transfer position.

When both media trays 41a are in the data writing position and the media tray 45 for the label printer 11 is at the inside printing position, the transportation arm 36 of the media transportation mechanism 31 can descend below the height of the printer media tray 45. A guide hole 65 is formed below the media transfer position of the printer media tray 45. When the media transportation arm 36 descends to this position and releases a disc, the disc passes through the guide hole 65. A separate media stacker further described below can also be installed in this guide hole 65.

As shown in FIG. 2 and FIG. 3, the drawer mechanism 7 has a tray 70 located below the main frame 30 so that the tray 70 can slide closed inside the main frame 30 or pull out of the main frame 30 to open. The tray 70 has a recessed stacker unit 71. When the tray 70 is in the stored (closed) position, the stacker unit 71 is positioned below the guide hole 65, and the center of the stacker unit 71 is positioned with the center of the stacker unit 71 coaxial to the center axis of the media trays 41a and the printer media tray 45 in the media transfer position. The stacker unit 71 accepts media M guided thereinto by the guide hole 65, and stores a relatively small number of media M (such as 5 to 10). The stacker unit 71 accepts the media M from the top and stores the media M in a coaxial stack.

A separate media stacker 72 (removable media stacker) that can hold more media M than the stacker unit 71 is removably held in the guide hole 65 and tray 70 in the closed position (see FIG. 3). This media stacker 72 also has two curved side walls 73 and 74. Media M can be loaded from the open top between the side walls 73 and 74, and a plurality of media M (such as 50) can be stored coaxially in a stack between the side walls 73 and 74. A gap enabling the transportation arm 36 of the media transportation mechanism 31 to move up and down is also formed between the pair of curved side walls 73 and 74. A handle 75 that is held by the user when installing and removing the media stacker 72 is positioned at the top part of the one side wall 74.

When the media stacker 72 is installed, a blank disc M is taken from the bottom media stacker 22, written and printed by a media drive 41 and the label printer 11, and then deposited in the media stacker 72.

When both the top media stacker 21 and the bottom media stacker 22 are loaded to capacity (50+50 discs in this embodiment of the invention) with blank media M, all media M (50) in the bottom media stacker 22 are sequentially processed and stored in the media stacker 72, and all media M (50) in the top media stacker 21 are then sequentially processed and stored in the emptied bottom media stacker 22. This enables batch processing the maximum number of media M (50+50) that can be loaded in the top media stacker 21 and the bottom media stacker 22 in a single operation (the "batch processing mode").

If the media stacker 72 is removed, a blank disc M can be removed from the top media stacker 21 or the bottom media stacker 22, and can be stored in the stacker unit 71 of the tray 70 in the stored (closed) position after the disc is written and printed by the media drive 41 and label printer 11.

The completed media M can thus be removed from the stacker unit 71 by pulling the drawer tray 70 out. More specifically, completed media M can be sequentially removed one by one or plural discs at a time while processing other media M continues and the access door 3 remains closed. This is also referred to herein as the "external discharge mode."

The media M can thus be appropriately conveyed between top media stacker 21, the bottom media stacker 22, the stacker unit 71 (or media stacker 72) of the tray 70, the media trays 41a of the media drives 41, and the printer media tray 45 of the label printer 11 by moving the transportation arm 36 of the media transportation mechanism 31 in various ways up and down while pivoting right or left.

As shown in FIG. 4, the label printer 11 has a carriage 62 with an inkjet head 61 having nozzles (not shown in the figure) for discharging ink. The carriage 62 moves bidirectionally horizontally along a carriage guide shaft by means of the drive power from a carriage motor (not shown in the figure).

The label printer 11 has an ink supply mechanism 60 with a cartridge carrier unit 14 in which the ink cartridges 12 are installed. The ink supply mechanism 60 is vertically constructed and is attached perpendicularly to the main frame 30 of the publisher 1. One end of a flexible ink supply tube 63 is connected to the ink supply mechanism 60, and the other end of the ink supply tube 63 is connected to the carriage 62.

Ink in the ink cartridges 12 loaded in the ink supply mechanism 60 is supplied through the ink supply tube 63 to the carriage 62. The ink is supplied to the inkjet head 61 through the damper unit and back pressure adjustment unit (not shown in the figure) positioned near the carriage 62, and discharged from the ink nozzles (not shown in the figure).

A pressurizing mechanism 64 is located with the main part at the top of the ink supply mechanism 60, supplies compressed air to pressurize the inside of the ink cartridge 12 and expels ink from the ink pack in the ink cartridge 12.

A head maintenance mechanism 81 is positioned below the home position (shown in FIG. 4) of the carriage 62.

The head maintenance mechanism 81 has a head cap 82 and a waste ink suction pump 83. The head cap 82 covers the ink nozzles of the inkjet head 61 exposed below the carriage 62 in the home position. The waste ink suction pump 83 vacuums ink discharged into the head cap 82 by the ink charging operation and the head cleaning operation of the inkjet head 61.

Ink that is removed by the waste ink suction pump 83 of the head maintenance mechanism 81 is discharged through another tube 84 into the waste ink absorption tank 85. This waste ink absorption tank 85 is an absorbent material not shown that is located inside the case 86, and has a cover 88 with numerous ventilation holes 87.

A waste ink catch pan 89 that is a part of the waste ink absorption tank 85 is positioned below the head maintenance mechanism 81 to catch and absorb ink that drips from the head maintenance mechanism 81 with an absorbent material.

*Media Transportation Mechanism

Figure 5:
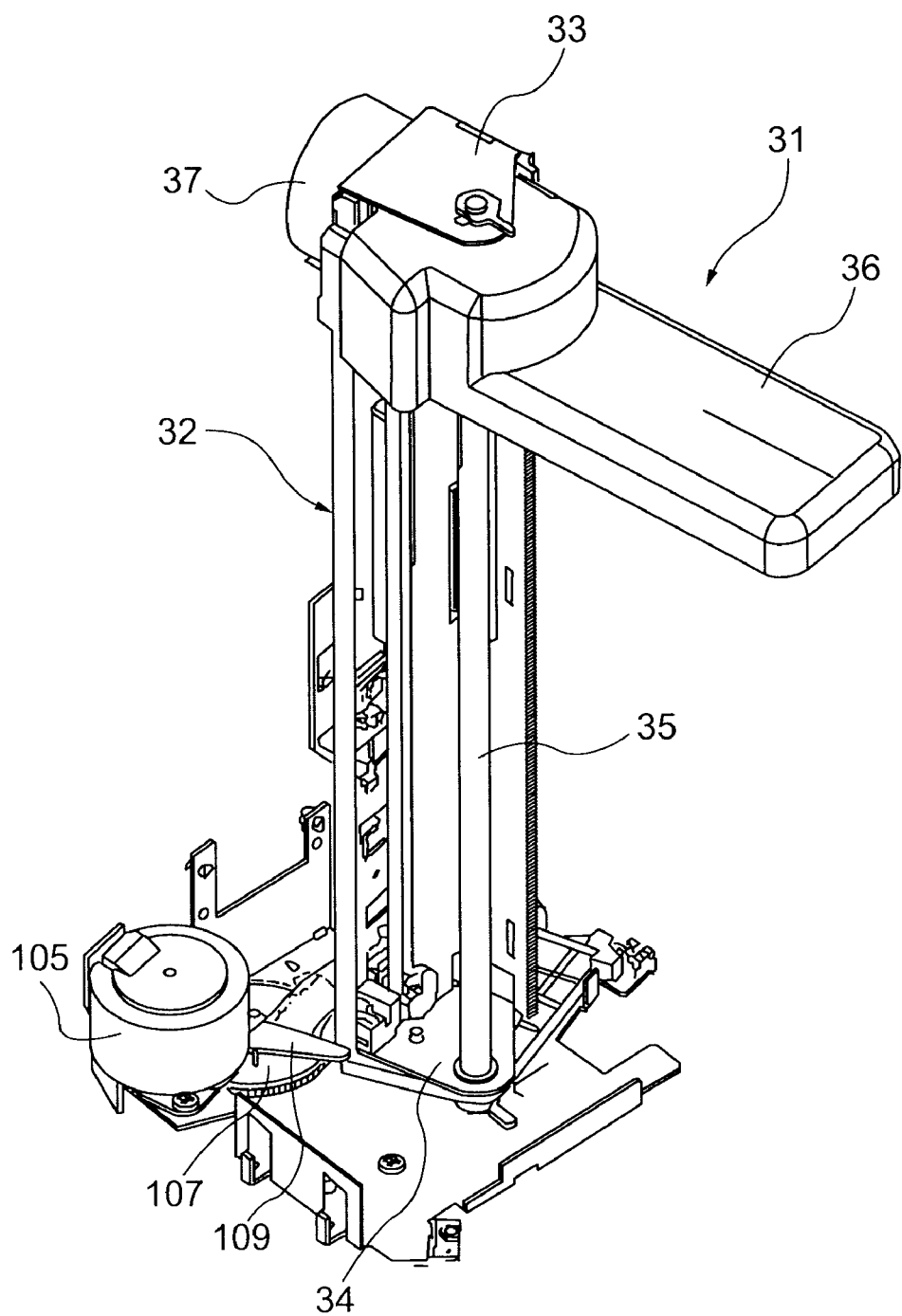
FIG. 5 is an oblique view of the media transportation mechanism.

FIG. 5 is an oblique view of the media transportation mechanism.

As shown in FIG. 5 the media transportation mechanism 31 has a chassis 32 that is fastened vertically, and a vertical guide shaft 35 connected between the support plate 34 fastened to the base 72 and the top plate 33 of the chassis 32. The transportation arm 36 is supported so that it can move vertically and pivot horizontally on the vertical guide shaft 35.

The elevator mechanism of the transportation arm 36 has a drive motor 37 that is the drive power source for raising and lowering the transportation arm 36. Torque from the drive motor 37 is transferred to a drive pulley that drives a timing belt 104 that travels between the top and bottom of the chassis 32. The base 110 (see FIG. 6) of the transportation arm 36 is connected to a part of the timing belt 104.

As a result, when the drive motor 37 is driven, the timing belt 104 moves vertically and the transportation arm 36 attached to the timing belt 104 travels up or down along the vertical guide shaft 35. The elevator drive motor 37 is a stepping motor and the vertical position of the transportation arm 36 can be controlled using the number of steps that the drive motor 37 is driven.

As shown in FIG. 5, the pivot mechanism of the transportation arm 36 has a drive motor 105 as the drive power source for swinging the transportation arm 36 horizontally. A pinion (not shown in the figure) is attached to the output shaft of the drive motor 105, and rotation of the pinion is transferred through a speed-reducing gear train including a transfer gear 107 to a fan-shaped end gear 109. This fan-shaped end gear 109 can pivot right and left on the vertical guide shaft 35. The chassis 32 on which the component parts of the elevator mechanism of the transportation arm 36 are assembled is mounted on the end gear 109. When the drive motor 105 is driven the fan-shaped end gear 109 rotates left and right, and the chassis 32 mounted thereon pivots in unison left and right on the vertical guide shaft 35. As a result, the transportation arm 36 supported by the elevator mechanism mounted on the chassis 32 swings left and right on the vertical guide shaft 35.

Components of the transportation arm 36 are described next.

Figure 6:
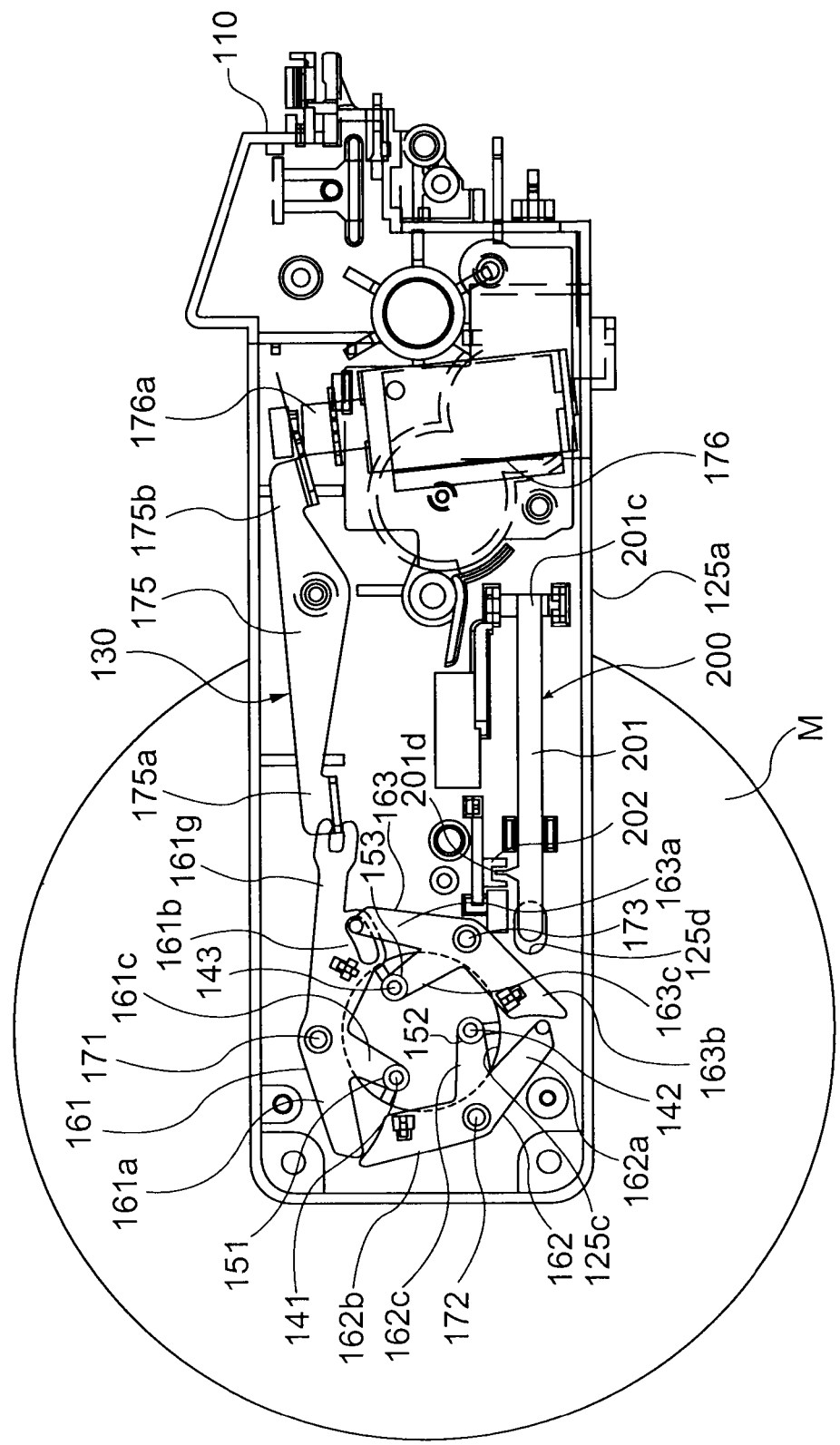
FIG. 6 is a plan view of the arm base used to describe the gripping mechanism.
Figure 7:
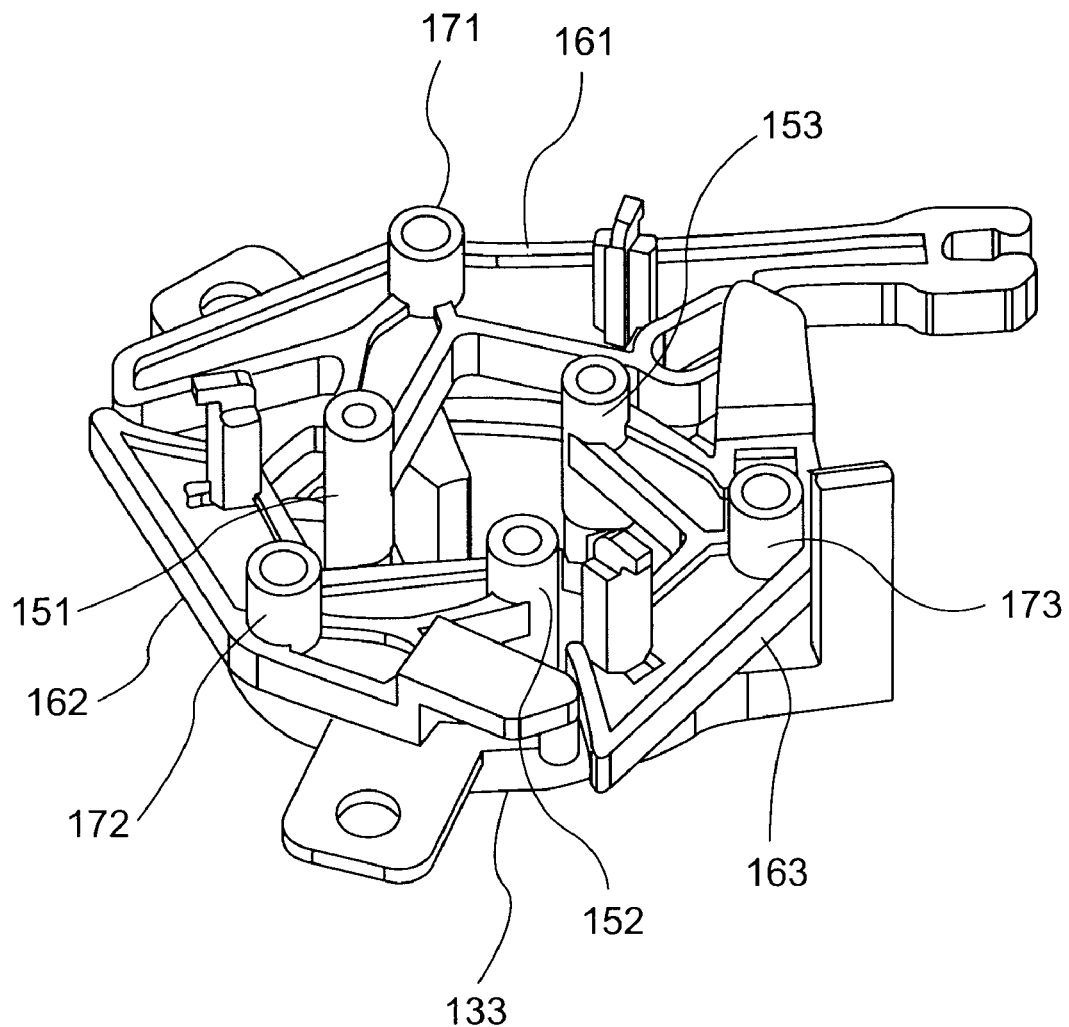
FIG. 7 is an oblique view of the fingers of the gripping mechanism.
Figure 8:
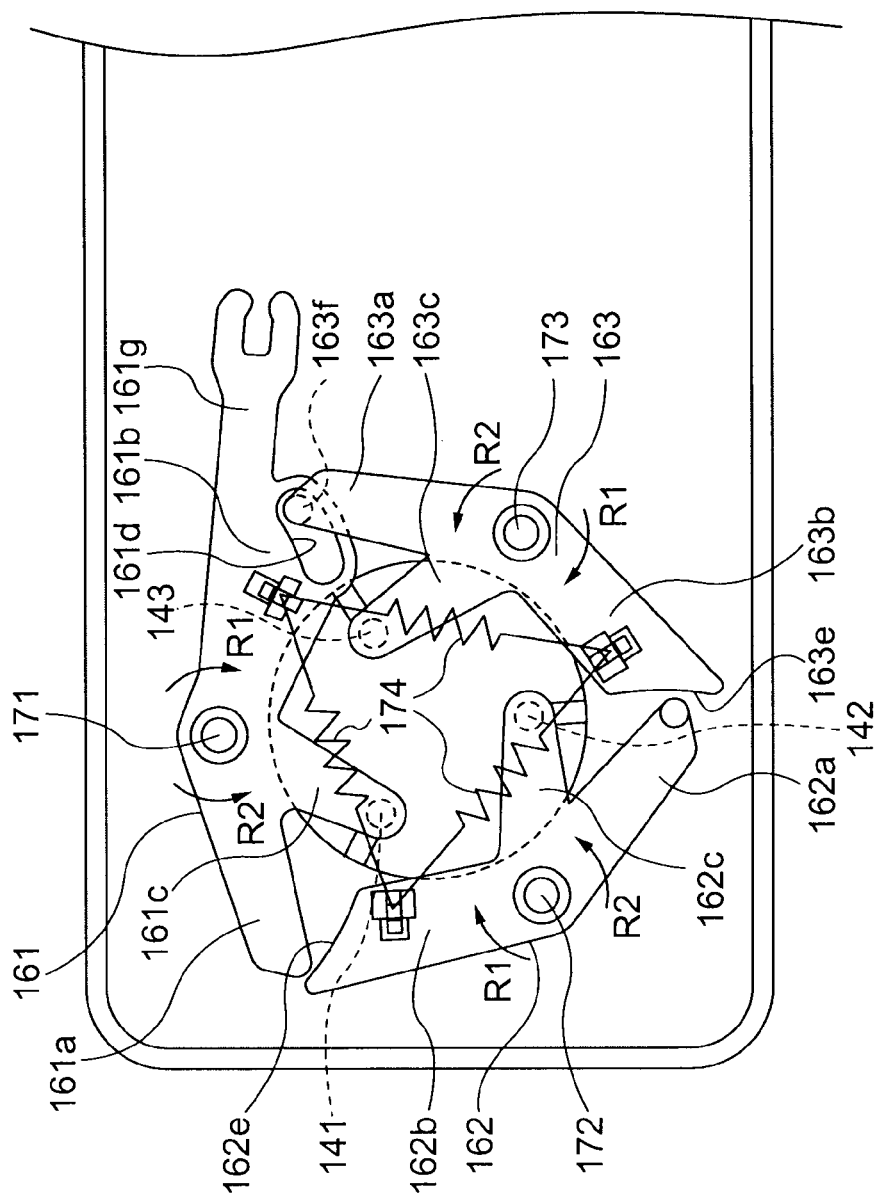
FIG. 8 is an enlarged plan view of the gripping fingers.
Figure 9:
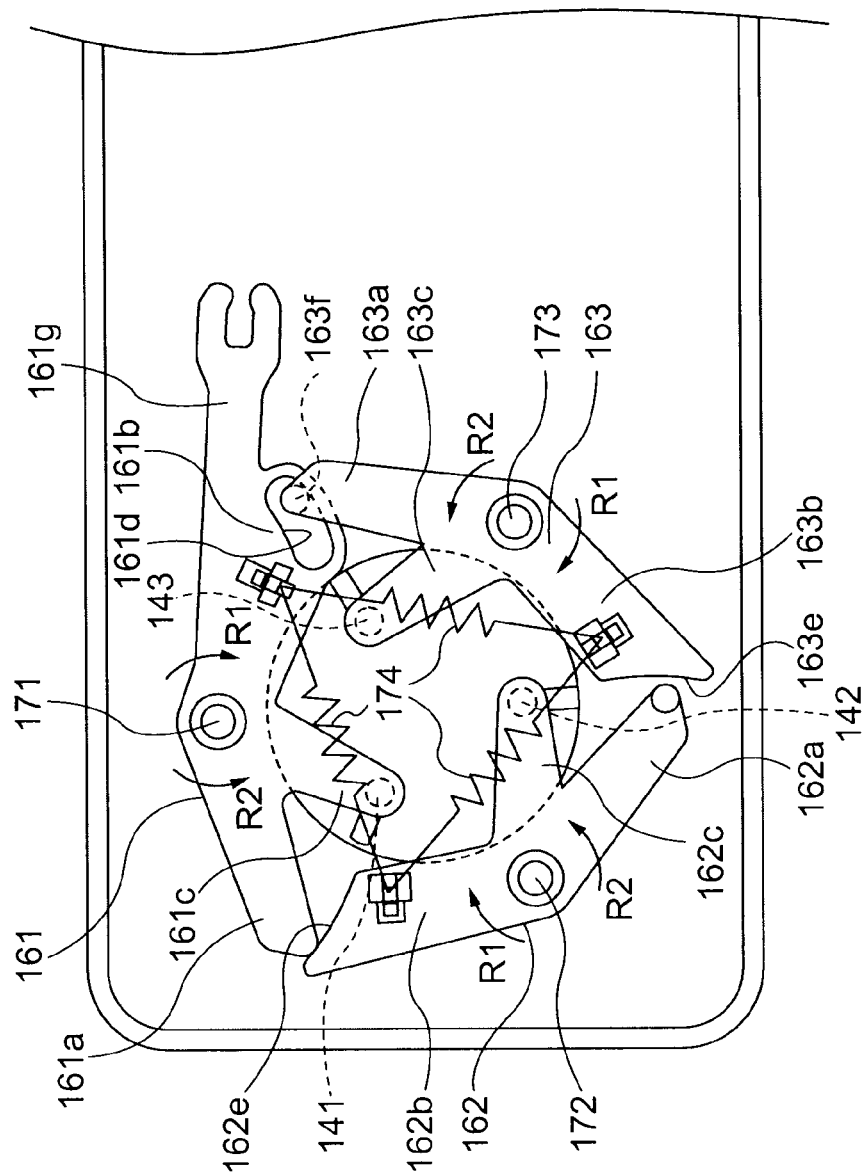
FIG. 9 is a plan view showing the operation of the spindle platter and the gripping fingers.
Figure 10:
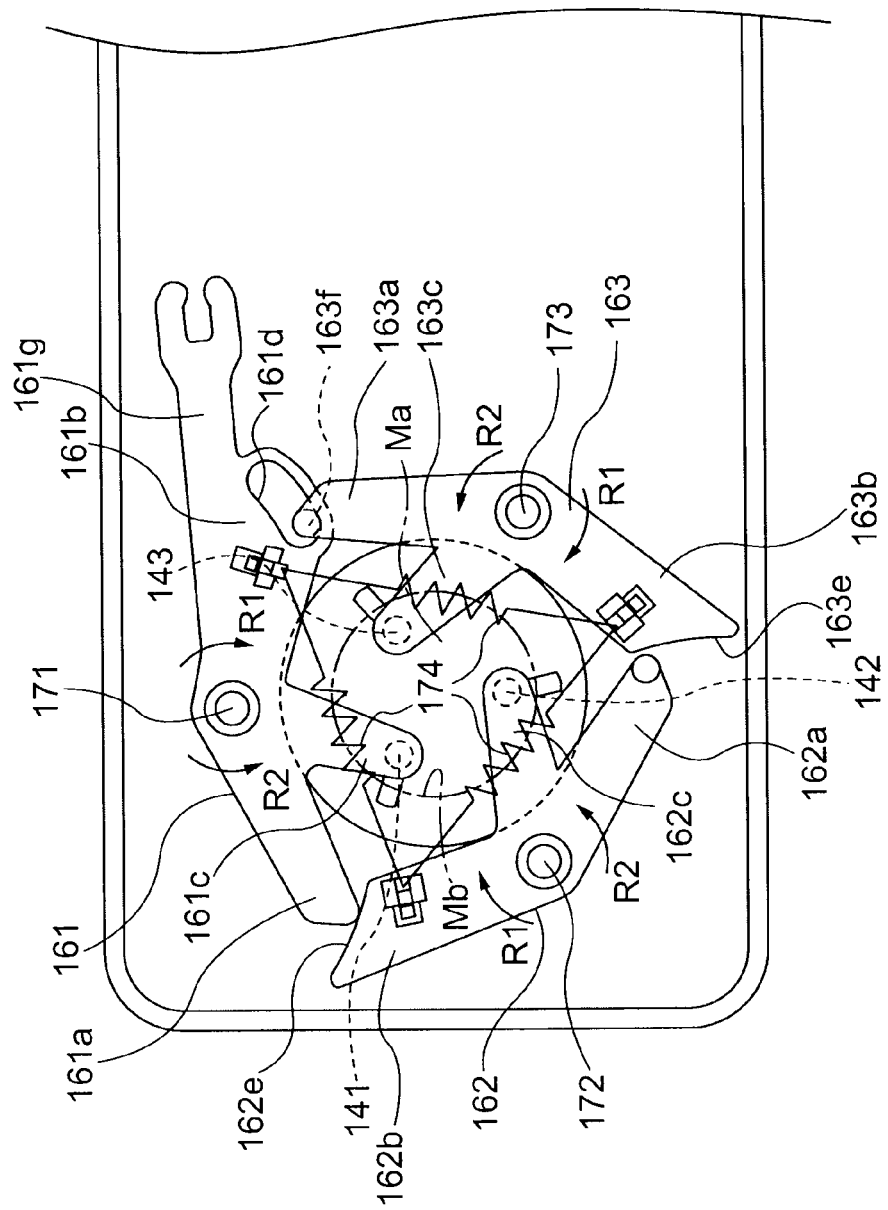
FIG. 10 is a plan view showing the operation of the spindle platter and the gripping fingers.
Figure 11:
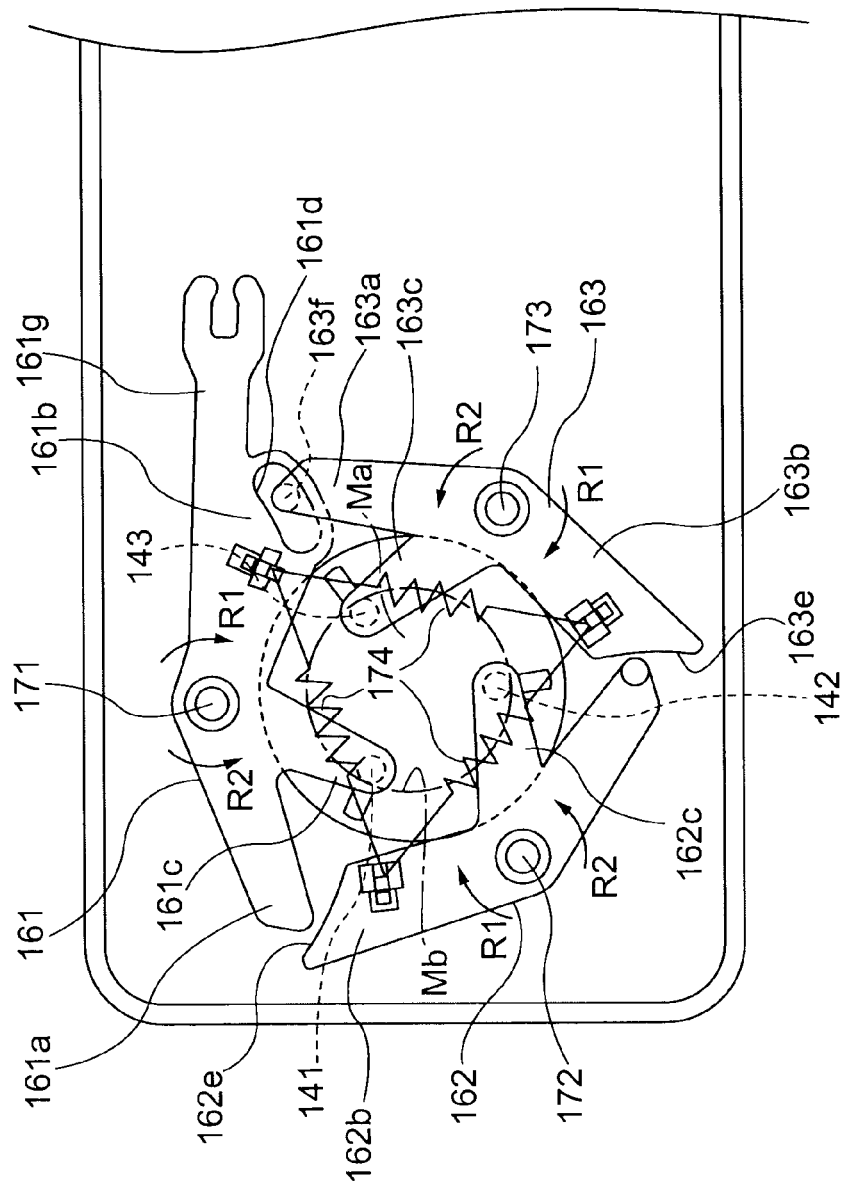
FIG. 11 is a plan view showing the operation of the spindle platter and the gripping fingers.

FIG. 6 is a plan view of the arm base used to describe the gripping mechanism, FIG. 7 is an oblique view of the fingers of the gripping mechanism, FIG. 8 is an enlarged plan view of the gripping fingers, and FIG. 9 to FIG. 11 are plan views describing the operation of the spindle platter and the gripping fingers.

As shown in FIG. 6, the transportation arm 36 has a long, slender arm base 125a that is substantially rectangular in plan view, and an arm case that has the same outside contour as and covers the top of the arm base 125a. A gripping mechanism 130 for holding the media M, and a media detection mechanism 200 are positioned in the transportation arm 36.

The gripping mechanism 130 has three tubular fingers 141 to 143 arranged in a circle at an equiangular interval (120°). The fingers 141 to 143 descend vertically from a round hole 125c formed in the distal end of the arm base 125a and are inserted to the center hole of the media M and spread to the outside radially to the hole to push against the inside circumference of the center hole of the media M and thereby grip the media M.

As shown in FIG. 6 and FIG. 7, the fingers 141 to 143 are attached to the bottom end of support pins 151 to 153. These support pins 151 to 153 pass through to the top of the round hole 125c in the arm base 125a, and are affixed to three pivot arms 161 to 163 positioned above the arm base 125a. Pivot pins 171 to 173 are affixed to the arm base 125a at an equiangular interval concentrically around the round hole 125c, and the pivot arms 161 to 163 are supported pivotably on these pivot pins 171 to 173.

As shown in FIG. 6 to FIG. 8, the pivot arms 161 to 163 each have a forward arm part 161a to 163a that extends toward the front of the arm base 125a substantially circumferentially to the round hole 125c (counterclockwise when seen from above), a back arm part 161b to 163b that extends toward the back substantially circumferentially to the round hole 125c (clockwise when seen from above), and a support arm 161c to 163c that extends from the pivot point of the pivot arm 161 to 163 to the inside of the round hole 125c. The support pins 151 to 153 are fixed vertically to the back side of the distal end part of the support arm 161c to 163c.

An oblong hole 161d is formed substantially radially to the round hole 125c in the back arm part 161b of the pivot arm 161. A slide pin 163f descending from the back end of the forward arm part 163a of the pivot arm 163 is inserted slidably to the oblong hole 161d.

A slide face 163e is formed substantially in line with the radius of the round hole 125c to the distal end of the back arm part 163b of pivot arm 163. The front end part of the forward arm part 162a of pivot arm 162 is positioned so as to not contact this slide face 163e.

A slide face 162e is formed substantially in line with the radius of the round hole 125c to the distal end of the back arm part 162b of pivot arm 162. The front end part of the forward arm part 161a of pivot arm 161 can slide against this slide face 162e.

The oblong hole 161d in the pivot arm 161 and the slide faces 162e, 163e of the pivot arms 162, 163 are formed with a concave curve that is set so that the pivot arms 161 to 163 all pivot in the same direction.

Coil tension springs (urging member) 174 connect the back arm part 161b of the pivot arm 161 and the back arm part 162b of the pivot arm 162, the back arm part 162b of the pivot arm 162 and the back arm part 163b of the pivot arm 163, and the back arm part 163b of the pivot arm 163 and the back arm part 161b of the pivot arm 161. The tension of the coil springs 174 holds the pivot arms 161 to 163 so that there is no play therebetween, and applies an urging force to the pivot arms 161 to 163 in the direction of arrow R1 in FIG. 8 (that is, in the direction causing the fingers 141 to 143 to separate and open).

When positioned as shown in FIG. 8, the diameter of the circumscribed circle of the fingers 141 to 143 attached to the distal ends of the support arm 161c to 163c of the pivot arms 161 to 163 is greater than the inside diameter of the center hole of the media M. When one pivot arm 161 rotates in the direction of arrow R2 from this position, the other two pivot arms 162 and 163 also turn in the same direction. This causes the support arms 161c to 163c of the pivot arms 161 to 163 to move toward the center of the round hole 125c, and the fingers 141 to 143 attached to the distal ends of the support arms 161c to 163c to close together so that the fingers 141 to 143 can be inserted to the center hole of the media M.

When the fingers 141 to 143 are then inserted to the center hole of the media M and the pivot arms 161 to 163 then pivot in the opposite direction R1, the fingers 141 to 143 open apart and are pushed to the outside in the radial direction. This causes the fingers 141 to 143 to push against the inside surface b of the center hole of the media M and thereby grip the media M.

The pivot arm 161 also has an operating arm 161g that extends away from the support arm 161c. The distal end of one arm part 175a of the link 175 is fit to pivot freely in the distal end part of the operating arm 161g. The link 175 is supported so that it can pivot freely at the middle on the arm base 125a. The distal end part of the other arm part 175b is connected to the operating rod 176a of a solenoid 176. The force of an internal spring pushes the operating rod 176a out to the extended position when the solenoid 176 is off.

When the solenoid 176 turns on, the operating rod 176a is retracted against the force of the internal spring, causing the link 175 to pivot and the pivot arm 161 to rock in the direction of arrow R2. As shown in FIG. 9, this also causes the slide face 162e of the back arm part 162b of the pivot arm 162 to slide against the distal end of the forward arm part 161a of the pivot arm 161, and the inside surface of the oblong hole 161d in the back arm part 161b of pivot arm 161 to slide against the slide pin 163f of the forward arm part 163a of pivot arm 163. As a result, the slide face 162e of pivot arm 162 slides against the distal end of the forward arm part 161a of pivot arm 161 and slides to the outside radially to the round hole 125c, causing the pivot arm 162 to pivot in the direction of arrow R2. The inside of the oblong hole 161d in back arm part 161b of pivot arm 161 also slides against the slide pin 163f of the forward arm part 163a of pivot arm 163 so that the forward arm part 163a of pivot arm 163 slides toward the center of the round hole 125c and the pivot arm 163 also pivots in the direction of arrow R2.

When the pivot arm 161 turns in the direction of arrow R2, the torque of the pivot arm 161 in the direction of arrow R2 is thus transferred to the other pivot arms 162 and 163. As shown in FIG. 10, the pivot arms 162 and 163 thus also pivot in the direction of arrow R2, the fingers 141 to 143 positioned near the support arms 161c to 163c of the pivot arms 161 to 163 are positioned inside a circumscribed circle that is smaller in diameter than the center hole of the media M, and are thus closed together so that they can be inserted to the center hole of the media M.

When the solenoid 176 then turns off, the force of the internal spring causes the operating rod 176a to extend and the link 175 to pivot. This circular motion of the link 175 is transferred to the pivot arm 161, and the pivot arm 161 turns in the direction of arrow R1. The force of the coil springs 174 causes the other two pivot arms 162 and 163 to move in conjunction with the pivot arm 161, thereby pulling the respective pivot arms 162b and 163b to move toward the center of the round hole 125c and causing the pivot arms 162 and 163 to also pivot like pivot arm 161 in the direction of arrow R1. As a result, as shown in FIG. 11, the fingers 141 to 143 are pushed apart so that the fingers 141 to 143 are pushed against the inside surface of the center hole of the media M, and the media M is thereby gripped.

Because the pivot arms 162 and 163 are pivoted independently of the pivot arm 161 in the direction of arrow R1 by the force of the coil springs 174, the fingers 141 to 143 also move independently radially to the outside and are pushed against the inside surface of the center hole of the media M.

Figure 12:
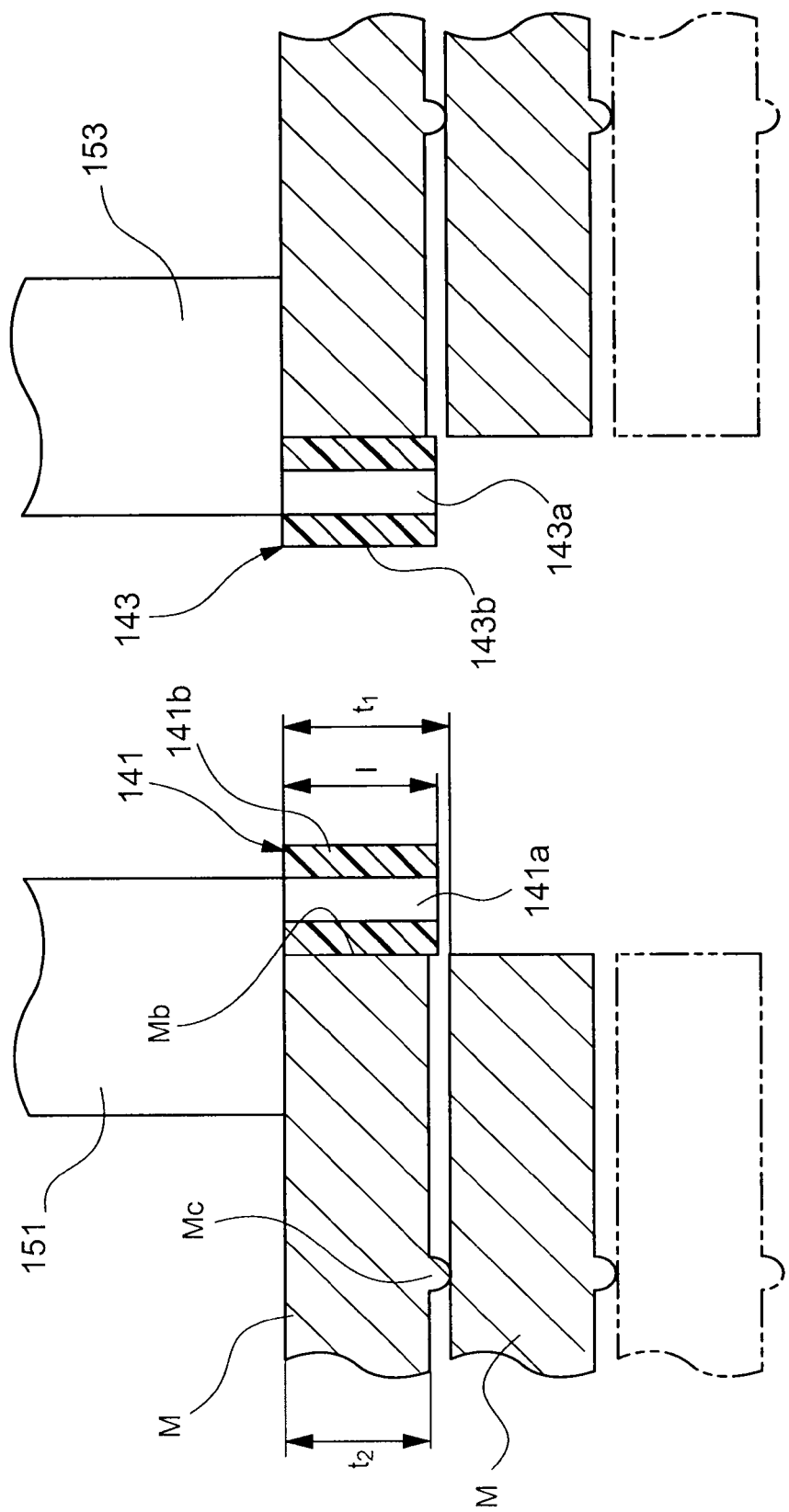
FIG. 12 is a section view of the gripping fingers used to describe the fingers in detail.

As shown in FIG. 12, the three fingers 141 to 143 each have a cylindrical pin 141a to 143a protruding from the bottom end of the corresponding support pin 151 to 153, and an elastic tube 141b to 143b made of rubber, for example, concentrically surrounding the pin 141a to 143a. The downward protruding height l of the three fingers 141 to 143 is less than or equal to the thickness t1 of the media M that the fingers 141 to 143 hold. This protruding height l is preferably greater than or equal to the thickness t2 of the inside surface Mb of the center hole Ma of the media M, and less than or equal to the thickness t1 of the media M including the height of an annular land Mc. This configuration enables gripping the one top disc M of the stack without the fingers 141 to 143 touching the inside surface Mb of the second disc M when picking a disc M from a substantially concentric stack of plural discs.

Figure 13:
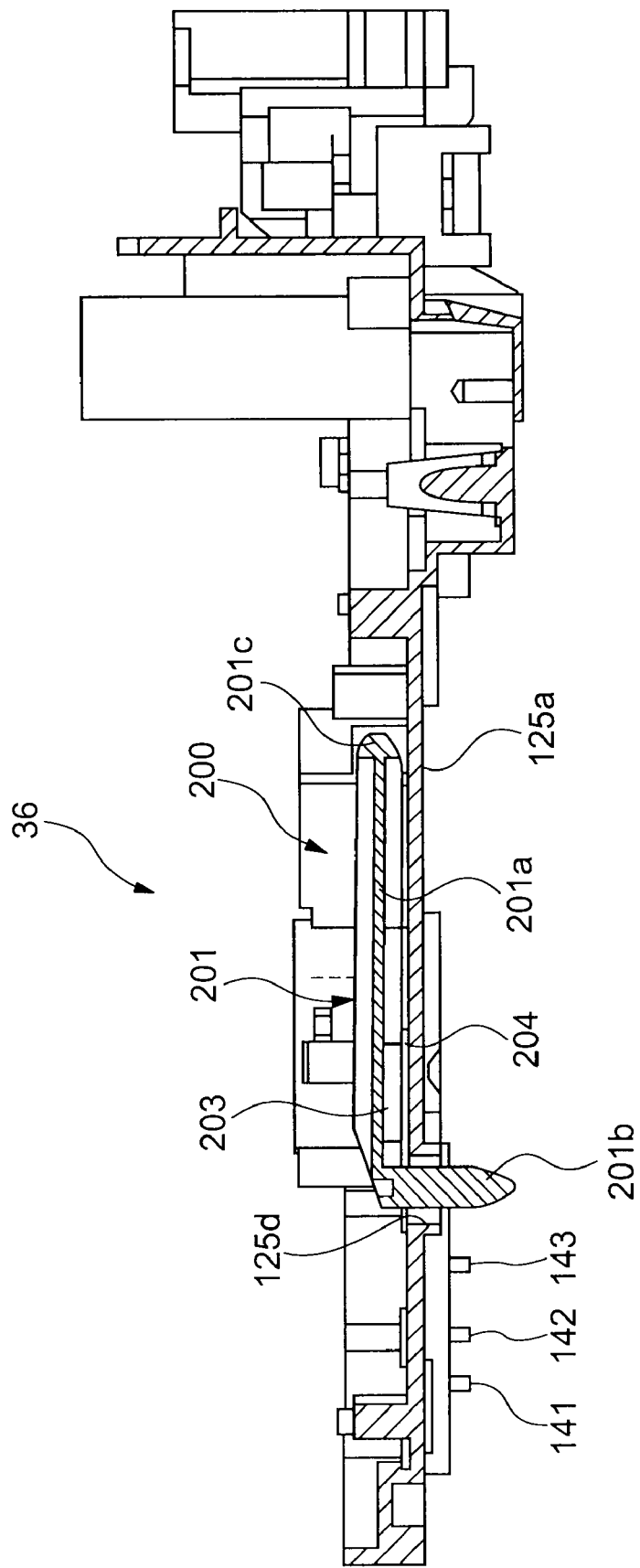
FIG. 13 is a section view showing the construction of the media detection mechanism.
Figure 14:
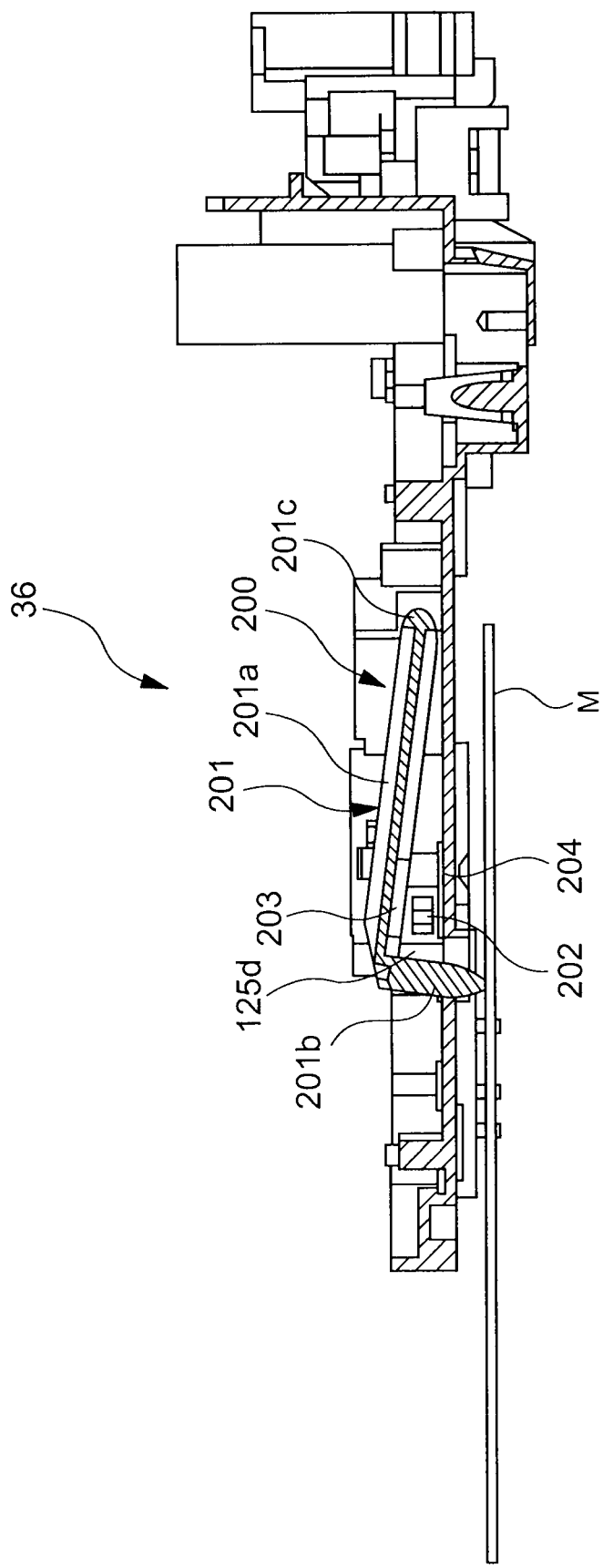
FIG. 14 is a section view showing the operation of the media detection mechanism.

FIG. 13 is a section view showing the construction of the media detection mechanism, and FIG. 14 is a section view describing the operation of the media detection mechanism.

As shown in FIG. 6 and FIG. 13, the media detection mechanism (media detection unit) 200 has a detection lever 201 and a detector 202 (media detector) positioned beside the detection lever 201. The detection lever 201 has an arm 201a supported with the base end 201c centered on a horizontal line so that the distal end can move up and down, and a contact unit 201b rendered by bending the distal end of the arm 201a down to form a detection probe that protrudes toward the bottom of the arm base 125a.

In the media-not-detected position shown in FIG. 13, the arm 201a of the detection lever 201 is resting on the arm base 125a, and the contact unit 201b of the detection lever 201 descends through the opening 125d formed in the arm base 125a and protrudes a specific height below the bottom of the arm base 125a, that is, to the side on which the media M is held. The detector 202 is a transmission type optical sensor. When in the media-not-detected position shown in FIG. 13, an interrupter 201d that protrudes to the side near the distal end of the arm 201a is in the detection area of the detector 202 and thus interrupts the detection beam, and the detection signal from the detector 202 turns off.

When the transportation arm 36 descends and the contact unit 201b on the distal end of the detection lever 201 contacts the top of the media M, the detection lever 201 of this media detection mechanism 200 pivots up and is displaced from the media-not-detected position touching the arm base 125a (the position shown in FIG. 13) to the media-detected position separated from the arm base 125a (the position shown in FIG. 14). When the detection lever 201 moves out of the detection area of the detector 202, the detector 202 turns on. That the gripping mechanism 130 has approached a disc M, or more specifically that a disc M is held by the gripping mechanism 130, can be detected from this detection signal from the detector 202.

The media detection mechanism 200 also has a magnet (attraction unit) 203 positioned near the arm 201a of the detection lever 201. This magnet 203 is a plastic magnet having a magnetic body mixed with a synthetic resin, and is affixed to the arm 201a of the detection lever 201. A steel plate (attraction unit) 204 that is attracted by the magnet 203 is positioned near the top of the arm base 125a at a position opposite the magnet 203 positioned near the arm 201a of the detection lever 201.

When the detection lever 201 of this media detection mechanism 200 contacts the arm base 125a and the contact unit 201b of the detection lever 201 is protruding below the bottom of the arm base 125a in the media-not-detected position, the magnetic force of the magnet 203 pulls the magnet 203 and the steel plate 204 together. As a result, when the detection lever 201 is in the media-not-detected position with the contact unit 201b protruding below the bottom of the arm base 125a, the force of attraction between the mutually attracted magnet 203 and steel plate 204 prevents the detection lever 201 from moving.

When the transportation arm 36 then descends from this position to where the top of the media M touches the contact unit 201b on the end of the detection lever 201, a force pushing up is applied to the distal end of the detection lever 201. When this lifting force causes the mutually attracted magnet 203 and steel plate 204 to separate, the detection lever 201 pivots upward on the point where the base end of the arm 201a joins the arm base 125a. The detection lever 201 is thus displaced from the media-not-detected position in contact with the arm base 125a to the media-detected position separated from the arm base 125a.

Conversely, when the gripping mechanism 130 releases its grip on the held disc M and the transportation arm 36 then rises and separates from the disc M, the detection lever 201 that was pivoted up to the media-detected position descends again due to its own weight. When the detection lever 201 swings down and is positioned to the media-not-detected position, the magnet 203 of the arm 201a contacts the steel plate 204, and the magnet 203 and steel plate 204 are mutually attracted due to the magnetic force of the magnet 203. As a result, the detection lever 201 is again held by the force of attraction between the magnet 203 and steel plate 204 so that the detection lever 201 does not move.

The control system of the publisher 1 according to a preferred embodiment of the control method of the invention is described next.

Figure 15:
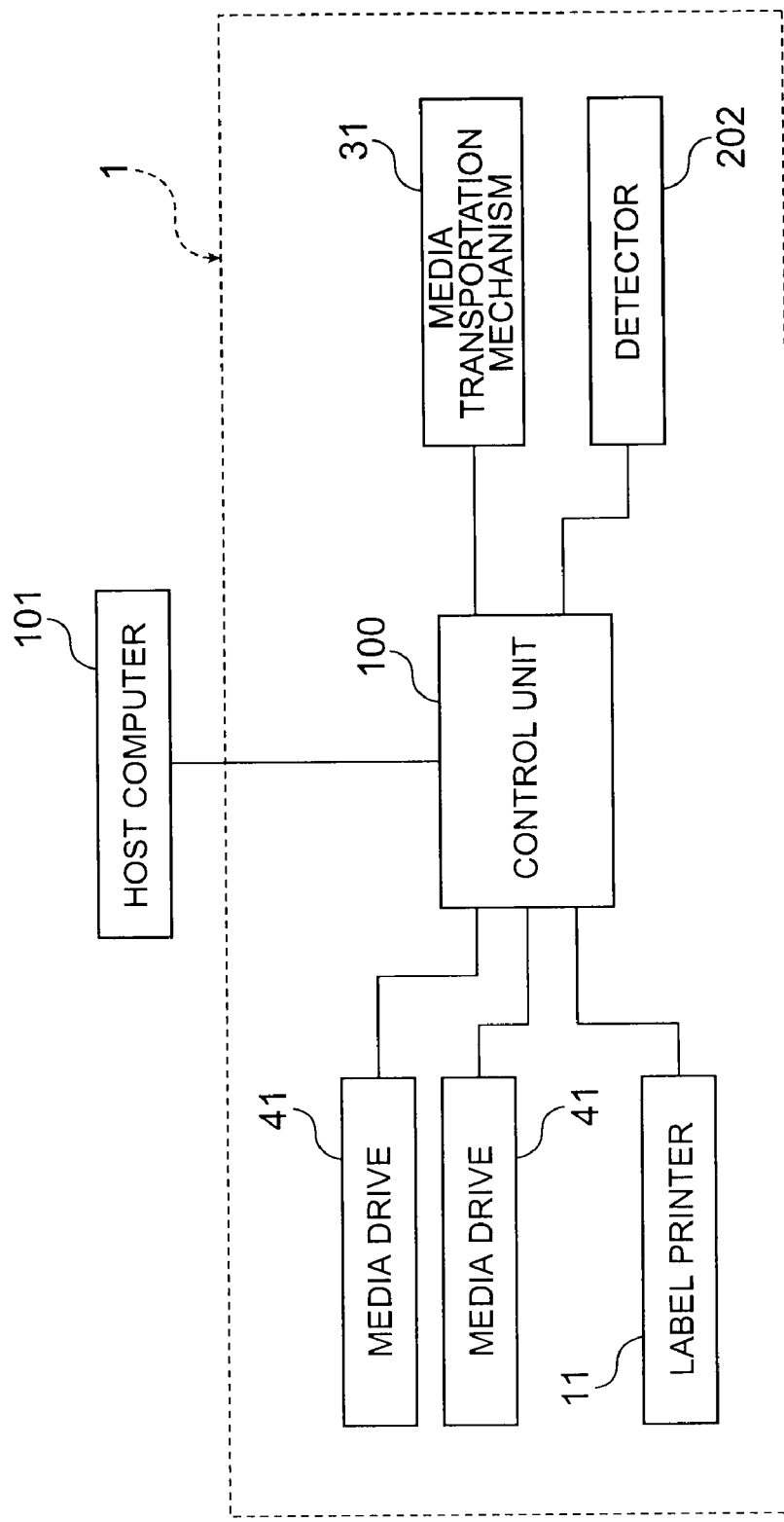
FIG. 15 is a block diagram showing the control system of the publisher.

As shown in FIG. 15 the publisher 1 has a control unit 100 that controls the operation of the other parts of the publisher 1. The control unit 100 is connected to communicate with a host computer 101 located externally to the publisher 1. The control unit 100 is a microcontroller including a CPU, ROM, RAM, and EEPROM. Based on control commands from the host computer 101, the control unit 100 controls transporting media M by means of the media transportation mechanism 31, writing data to the media M by means of the media drive 41, and printing a label on the label side of the media M by means of the label printer 11. The control unit 100 is also connected to the media detection mechanism 200, and controls the operation of the media transportation mechanism 31 or outputs an error signal based on the detection signals from the media detection mechanism 200.

When the control unit 100 receives a command from the host computer 101, the control unit 100 controls writing data and printing the media M according to the steps of the previously set processing mode, such as the batch processing mode. The media transportation mechanism 31 is then driven to carry a disc M stored in the top media stacker 21 or the bottom media stacker 22 to the media tray 41a of the media drive 41 or the printer media tray 45 of the label printer 11. If the supply of media M in the media stackers 21 and 22 is depleted, unprocessed (blank) media M must be added. The control method of the invention detects when the last disc M in the media stackers 21 and 22 has been removed or is about to be removed.

A first embodiment of the control method of the media transportation mechanism according to the present invention is described next.

Figure 16:
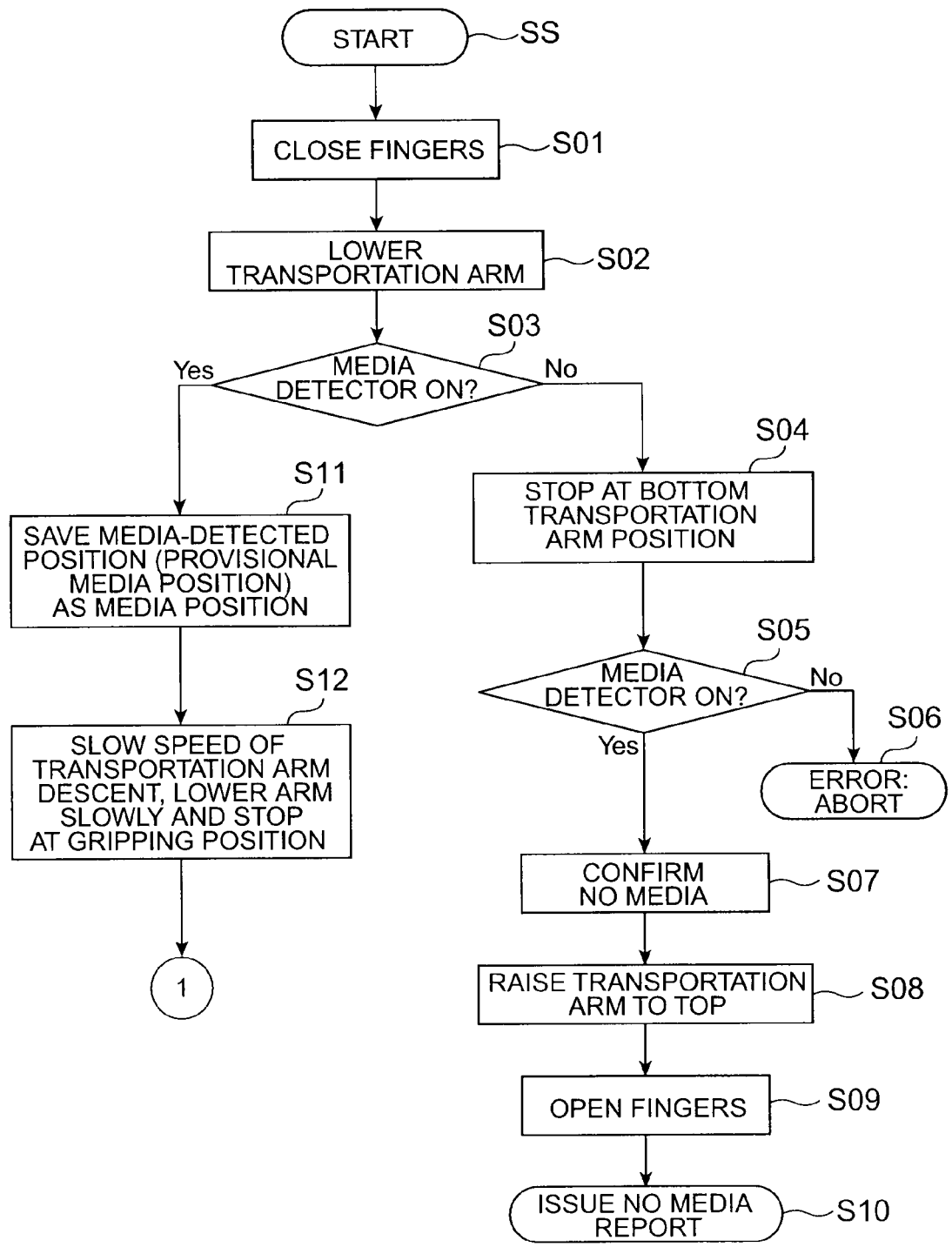
FIG. 16 is the first part of a flow chart showing the control method according to a first embodiment of the invention.
Figure 17:
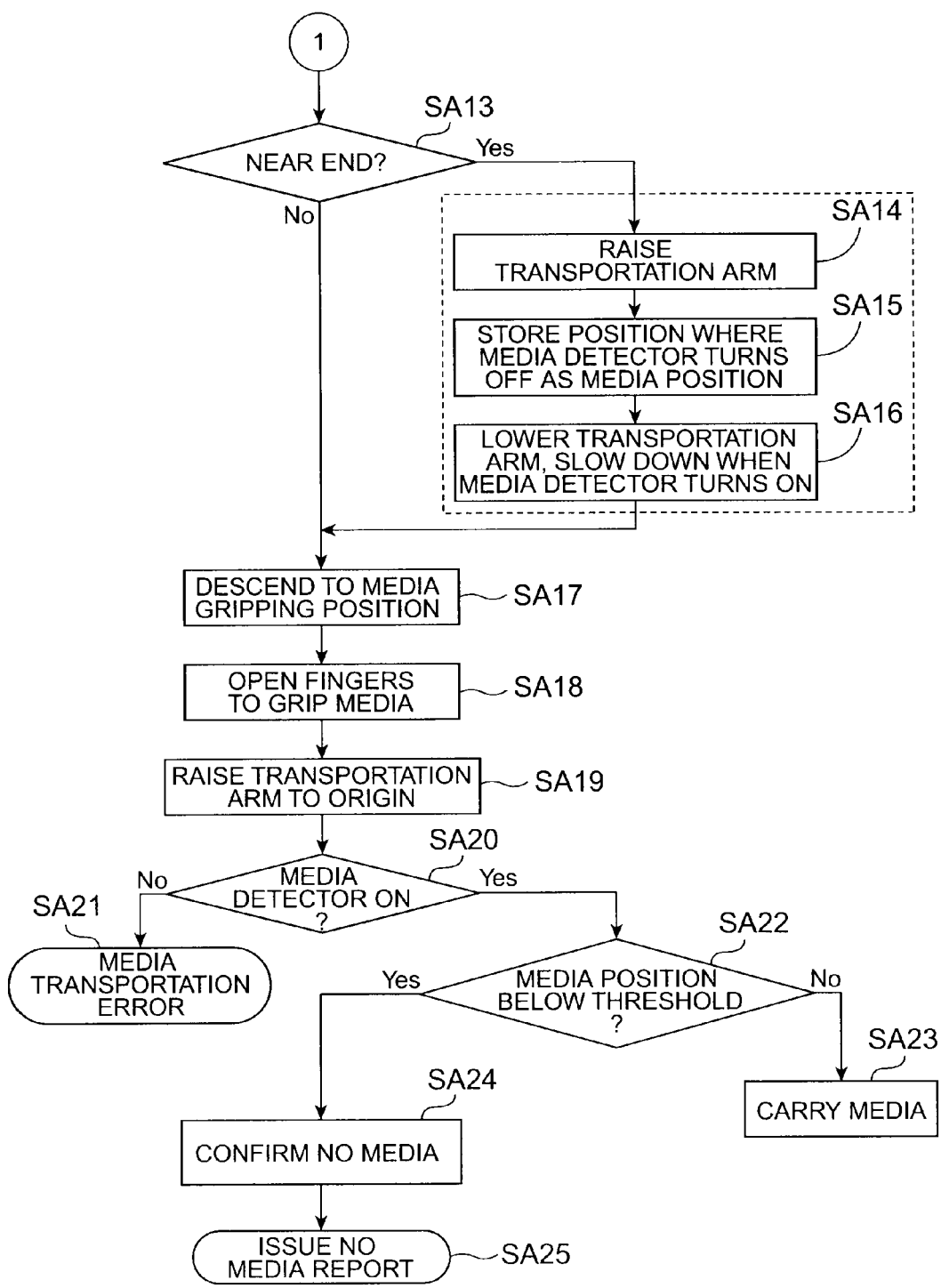
FIG. 17 is the second part of a flow chart showing the control method according to a first embodiment of the invention.
Figure 18:
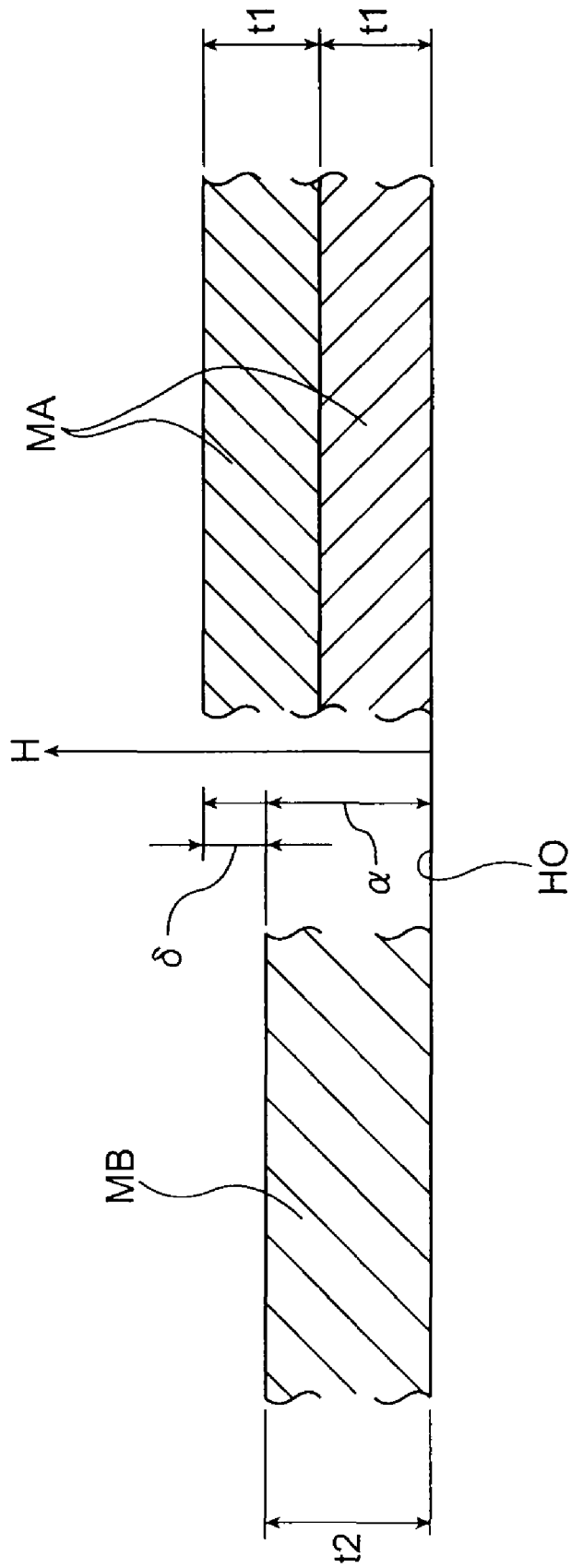
FIG. 18 describes the threshold limits used in the control method according to the present invention.

FIG. 16 is the first part of a flow chart describing the control method according to a first embodiment of the invention, FIG. 17 is the second part of the flow chart, and FIG. 18 describes the threshold limits used to determine the last disc in the stack.

The control method of the media transportation mechanism according to a first embodiment of the invention is a method whereby the control unit 100 controls the media transportation mechanism 31, which as described above has a transportation arm 36 that can travel up and down and grip the top disc M stored in a stack in the media stackers 21 and 22 used as the media storage units. The control method is described below using the top media stacker 21 by way of example.

The transportation arm 36 is controlled to descend into the top media stacker 21, and then pause when the media detection mechanism 200 outputs the media-detected signal. The transportation arm 36 is then raised and the position of the transportation arm 36 when the media detection mechanism 200 outputs the media-not-detected signal is stored as the media height. As shown in FIG. 18, the media height H and the threshold limit α are referenced to the height H0 of the bottom of the top media stacker 21. After measuring and storing the media height H, the transportation arm 36 is lowered again to grip and lift the top disc on the media M stacked in the media stacker 21, and the media height H is compared with a prescribed threshold limit α. If the media height H is less than the threshold limit α, the number of discs in the top media stacker 21 is known to be a prescribed count (such as 0). More specifically, the gripped media M is known to be the last disc M.

These steps are described more specifically below.

As shown in FIG. 16, when the media transportation process starts (step SS) and the transportation arm 36 is at a prescribed height (such as the home position at the top end of the stroke, or an intermediate position between the top and bottom), the solenoid 176 turns on (step S01) to close the three fingers 141 to 143 until they can be inserted to the center hole of the media M, and the transportation arm 36 then starts to descend (step S02). The target position to which the transportation arm 36 is lowered at this time is the height H0 of the bottom of the top media stacker 21 (see FIG. 18). The height H0 of the bottom is stored in EEPROM as a factory-set logic value when the publisher 1 is shipped. When the transportation arm 36 is raised and lowered, the height of the transportation arm 36 is controlled using the number of steps that the drive motor 37 is driven.

The output of the detector 202 of the media detection mechanism 200 is then monitored as the transportation arm 36 descends (step S03). When the detector 202 turns on, that is, when the contact unit 201b of the detection lever 201 contacts the top of the disc M and is pushed up so that the detection lever 201 is displaced from the detection position (step S03 returns Yes), a disc M is known to be in the media stacker 21. The height at which the detector 202 turned on is thus measured and stored as a provisional media height H (step S11).

The media height H can be determined using the number of steps the drive motor 37 is driven. More particularly, the position of the transportation arm 36 can be acquired from the number of steps as the distance descended from a transportation arm 36 reference position. However, because the height of this reference position is known as the height from the height H0 of the bottom of the media stacker 21, the height from this bottom height H0 can be known by subtracting the distance descended from the height of the reference position. Note that the position can alternatively be detected by attaching a rotary encoder to the drive motor 37 or disposing a linear encoder along the vertical guide shaft 35 along which the transportation arm 36 travels up and down.

Furthermore, because the transportation arm 36 travels a long distance, slowing the rate of descent is difficult in step S03 because of the need for a efficient speed. The media height H measured and stored in step S11 is therefore measured while the transportation arm 36 descends at the normal speed, and could contain a degree of error. It is therefore used as a provisional media height H.

If the transportation arm 36 descends to the height H0 of the bottom of the media stacker 21 without the detector 202 turning on in step S03, the transportation arm 36 stops (step S04). Whether the detector 202 turns on again is then detected (step S05). If the detector 202 turns on, an error results because the detector 202 turned on even though media M is not present, and the media transportation process aborts (step S06). If the detector 202 does not turn on, it is known that a disc is not in the media stacker 21 (step S07), the transportation arm 36 is moved to the top (step S08), and the solenoid 176 turns off.

When the solenoid 176 turns off the spring inside the solenoid 176 pulls the operating rod 176a in and the fingers 141 to 143 therefore open (step S09). The user is then prompted that there are no media M in the stacker, and the transportation process ends (step S10). The user is preferably prompted to add media M using a buzzer in addition to displaying a message on a display panel.

Once the detector 202 turns on in step S03 and the provisional media height H is stored (step S11), the speed at which the transportation arm 36 descends is reduced to lower the transportation arm 36 at a low speed to the media gripping position, and the transportation arm 36 is then stopped (step S12).

Whether the end of the stack is near is then detected (near-end detection) using the stored provisional media height H as shown in FIG. 17 (step SA13). The near-end state as used herein indicates that there is approximately one disc remaining in the stacker. The media height when there are two or three discs in the stack could therefore alternatively be used as the near-end detection threshold, in which case a near-end state would be true when the provisional media height H is less than the height used as the near-end detection threshold value. The near-end detection threshold is preferably set to detect when there are at least two discs left in the stack in order to accommodate any error that might be contained in the provisional media height H.

If step SA13 determines the stack is near the end (step SA13 returns Yes), the number of media M in the media stacker 21 is known to be 1 or perhaps 2 or 3. The media height H at that position is therefore determined more accurately to determine if there is only one disc M left. To do this the transportation arm 36 rises slowly (step SA14) and the position at which the detector 202 turns off is stored as the true media height H (step SA15). The transportation arm 36 is then lowered, the speed is reduced when the detector 202 turns on (step SA16), and the transportation arm 36 is lowered to the media gripping position (step SA17).

The solenoid 176 is then turned off so that the internal spring pulls the operating rod 176a in, causing the fingers 141 to 143 to spread open and hold the media M (step SA18) as the transportation arm 36 rises to the reference position (the origin of the stepping motor) (step SA19). Because the media M is held when the solenoid 176 is off, the disc will continue to be held and prevented from dropping if the power is cut off while a disc is being transported.

After raising the transportation arm 36 to the reference position the detector 202 confirms if a disc M is held by the transportation arm 36 (step SA20). If the detector 202 is not on (step SA20 returns No), a media transportation error has occurred and the transportation process ends (step SA21). However, if the detector 202 is on in step SA20 and a disc M is confirmed held by the transportation arm 36 (step SA20 returns Yes), whether the media height H stored in step SA15 is below the prescribed threshold limit $\alpha$ is determined (step SA22).

If the media height H in step SA22 is not less than the threshold limit $\alpha$, it can be determined that the media height H measured in step SA15 is greater than the height of two media M, the gripped disc M is not the last disc, and there is still another disc M in the media stacker 21. As a result, media M transportation continues (step SA23).

However, if the media height H in step SA22 is less than the threshold limit $\alpha$, the media height H measured in step SA15 is the height of a single disc M, the transportation arm 36 is holding the last disc and the media stacker 21 is now empty (step SA24). A prompt telling the user that there are no media M in the media stacker 21 is therefore issued (step SA25). Transporting the disc M then continues or the transportation arm 36 stops after reporting there are no more discs M.

As shown in FIG. 18, the threshold limit $\alpha$ is set with consideration for differences in the thickness of mass-produced media, and is set less than the thickness (2*t1) of two of the thinnest media MA used and greater than the thickness (t2) of one of the thickest media MB used, that is, within the range of $\delta$ in FIG. 18. By thus setting the threshold limit $\alpha$, the last disc in the stack can be reliably detected even if media M of different thicknesses are used.

If the near-end of the stack is not detected in step SA13 (step SA13 returns No), there are two or more media M in the media stacker 21, and the transportation arm 36 therefore descends to the media gripping position (step SA17). By skipping steps SA14 to SA16 described above, processing time can be shortened when there are at least two discs M left in the stack.

With the control method of a media transportation mechanism and the media processing device according to the first embodiment described above, the transportation arm 36 is lowered toward the media stacker 21, the transportation arm 36 is paused when the media detection mechanism 200 positioned near the transportation arm 36 detects that a disc M is in the stacker, the transportation arm 36 is then raised and the position at which the media detection mechanism 200 stops detecting the media is stored as the media height H. The height of the media in the stacker can thus be accurately measured. While error occurs easily if the media height is measured at the descent rate of the transportation arm 36 when the transportation arm 36 descends to grip a disc M, the height of the media can be accurately measured by stopping the transportation arm 36 when media is detected and then measuring the thickness of the media M as the transportation arm 36 rises.

After gripping a disc M and raising the transportation arm 36, the stored media height H is compared with the threshold limit $\alpha$. If the media height H is less than the threshold limit $\alpha$, the disc M held by the transportation arm 36 is known to be the last disc, and the number of media M left in the media stacker 21 can correctly be determined to be zero. As a result, the user can be informed that the number of media M left in the media stacker 21 is zero, the user can therefore replenish the supply of blank media M before there are no media M to process, the amount of time wasted by the media processing device idling due to a lack of media M can be minimized, and processing can proceed efficiently.

The media height detected when the transportation arm 36 descends is used as a provisional (approximate) media height H, and this approximate media height H is used to detect a near-end state. The true media height H is only measured and stored after the near-end is detected, and the last disc M can thereby be accurately detected. If the near-end is not detected, the media transportation process can continue without determining if the disc is the last disc. As a result, the normal processing speed is not decreased because whether a disc is the last disc is only determined after the near-end is detected.

The control method of a media transportation mechanism according to a second embodiment of the invention is described next.

Figure 19:
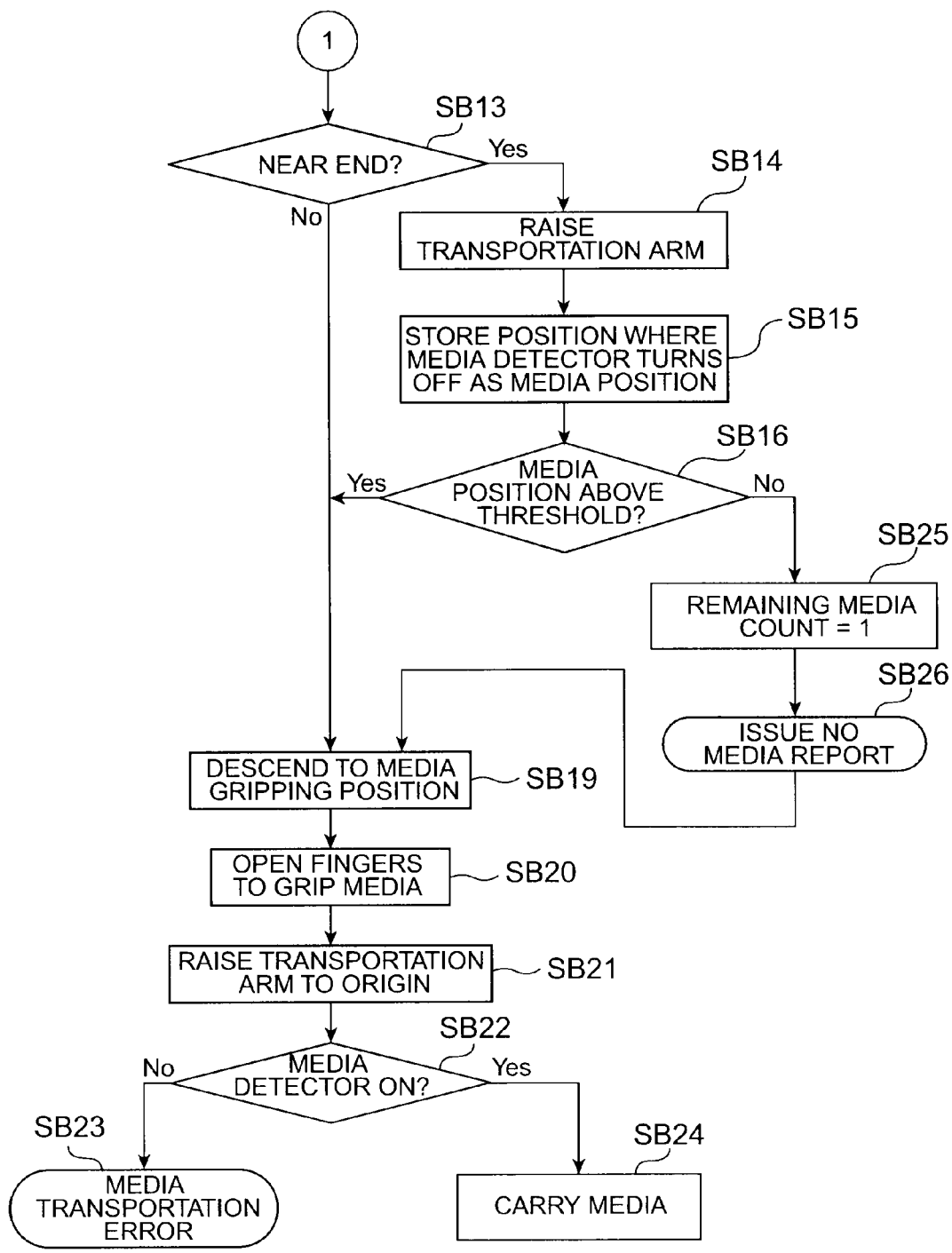
FIG. 19 is the second part of a flow chart showing the control method according to a second embodiment of the invention.

FIG. 19 is a flow chart showing the second part of the media transportation mechanism control method according to this second embodiment of the invention.

As in the first embodiment of the invention, the media transportation mechanism control method according to this second embodiment of the invention is a method enabling the control unit 100 to control a media transportation mechanism 31 that has a transportation arm 36 which can travel vertically and can grip the top disc M stored in a stack in a media stacker 21, 22 (media storage unit), and detects the last disc M stored in one of the media stackers 21 or 22 (media stacker 21 is used by way of example below).

The transportation arm 36 is controlled to descend into the top media stacker 21, and then pause when the media detection mechanism 200 outputs the media-detected signal. The transportation arm 36 is then raised and the position of the transportation arm 36 when the media detection mechanism 200 outputs the media-not-detected signal is stored as the media height H. After measuring and storing the media height H, the media height H is compared with a prescribed threshold limit α. If the media height H is less than the threshold limit α, the number of discs in the top media stacker 21 is known to be a 1. More specifically, the disc M to be gripped is known to be the last disc M.

These steps are described more specifically below.

The first part of the process according to this embodiment of the invention is the same as shown in the flow chart in FIG. 16 for the first embodiment.

Once the detector 202 turns on in step S03 and the provisional media height H is stored (step S11), the speed at which the transportation arm 36 descends is reduced to lower the transportation arm 36 at a low speed to the media gripping position, and the transportation arm 36 is then stopped (step S12).

Whether the end of the stack is near (near-end detection) is then detected using the stored provisional media height H as shown in FIG. 19 (step SB13).

If step SB13 determines the stack is near the end (step SB13 returns Yes), the number of media M in the media stacker 21 is known to be 1 or perhaps 2 or 3. The media height H at that position is therefore determined more accurately to determine if there is only one disc M left. To do this the transportation arm 36 rises slowly (step SB14) and the position at which the detector 202 turns off is stored as the true media height H (step SB15).

Whether the media height H stored in step SB15 is greater than the prescribed threshold limit α is then determined (SB16).

If the media height H is greater than or equal to the threshold limit α in step SB16, the media height H measured in step SB15 is the height of two or more media M, and it is known that the disc M to be gripped is not the last disc M and there are two or more media M in the media stacker 21. The transportation arm 36 therefore descends to the media gripping position (step SB19).

The solenoid 176 is then turned off so that the internal spring pulls the operating rod 176*a* in, causing the fingers 141 to 143 to spread open and hold the media M (step SB20) as the transportation arm 36 rises to the reference position (the origin of the stepping motor) (step SB21).

After raising the transportation arm 36 to the reference position the detector 202 confirms if a disc M is held by the transportation arm 36 (step SB22). If the detector 202 is not on (step SB22 returns No), a media transportation error has occurred and the transportation process ends (step SB23). However, if the detector 202 is on in step SB22 and a disc M is confirmed held by the transportation arm 36 (step SB22 returns Yes), media M transportation continues (step SB24).

If the media height H is less than the threshold limit α in step SB16 (step SB16 returns No), the media height H measured in step SB15 is the height of one disc M, and it is known that the disc M to be gripped is the last disc M (step SB25). A warning that the last disc M will be removed from the media stacker 21 is therefore issued (step SB26). Transporting the disc M then continues (steps SB19-SB24) or the transportation arm 36 stops after reporting there are no more discs M.

If the near-end is not detected in step SB13 (step SB13 returns No), the disc M to be gripped is not the last disc, and there are at least two or more discs M remaining in the media stacker 21. The transportation arm 36 therefore descends to the media gripping position (step SB19). Steps SB20 to SB24 then execute as described above. More specifically, by not executing steps SB14 to SB16, the processing time can be shortened when there are at least two discs M remaining in the stack.

As described in the first embodiment above, with the control method of a media transportation mechanism and the media processing device according to this second embodiment of the invention, the transportation arm 36 is lowered toward the media stacker 21, the transportation arm 36 is paused when the media detection mechanism 200 positioned near to the transportation arm 36 detects that a disc M is in the stacker, the transportation arm 36 is then raised and the position at which the media detection mechanism 200 stops detecting the media is stored as the media height H. The height of the media in the stacker can thus be accurately measured. While error occurs easily if the media height is measured at the descent rate of the transportation arm 36 when the transportation arm 36 descends to grip a disc M, the height of the media can be accurately measured by stopping the transportation arm 36 when media is detected and then measuring the thickness of the media M as the transportation arm 36 rises.

If the stored media height H is compared with the threshold limit a before the transportation arm 36 grips a disc M and the media height H is less than the threshold limit α, the disc M to be gripped by the transportation arm 36 is known to be the last disc, and the number of media M left in the media stacker 21 can correctly be determined to be one. As a result, the user can be informed that the number of media M left in the media stacker 21 will go to zero, the user can therefore replenish the supply of blank media M before there are no media M to process, the amount of time wasted by the media processing device idling due to a lack of media M can be minimized, and processing can proceed efficiently.

As described in the first embodiment, the normal processing speed is not decreased because whether a disc is the last disc is only determined after the near-end is detected.

In the first and second embodiments described above, the media detection mechanism 200 measures the height of the media M in the stack at a position offset between the media-detected position and the media-not-detected position. The height H0 of the bottom of the publisher 1 and the media height H can therefore be determined relative to the position of the transportation arm 36, and a simple calculation can be used to determine the last disc M.

The media handled by the invention are not limited to disc-shaped media such as the media M described above, and the invention can also be used with rectangular or other polygonally shaped media as well as oval media. The media are also not limited to any particular optical, magneto-optical, or other type of recording method.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A control method for a media transportation mechanism having a transportation arm that can grip media stacked in a media storage unit and can move linearly, and a media detection mechanism that is positioned near the transportation arm and can detect if media is present, comprising steps of:
    lowering the transportation arm to the media storage unit;
    pausing the transportation arm when the media detection mechanism detects media;
    storing as the media height the position where the media detection mechanism stops detecting the media when the transportation arm rises;
    lowering the transportation arm again, gripping the media in the media storage unit, and then raising the transportation arm; and
    comparing the media height with a height threshold limit, and determining a number of media remaining in the media storage unit based on a comparison of the media height with the height threshold limit.

2. The media transportation mechanism control method described in claim 1, wherein the determining step further comprises determining whether the number of media remaining in the media storage unit is a prescribed number, if the media height is less than the height threshold limit.

3. The media transportation mechanism control method described in claim 2, wherein the prescribed number of media is zero.

4. The media transportation mechanism control method described in claim 1, wherein:
    the height threshold limit is set using a value that is less than the thickness of two of the thinnest usable media and is greater than the thickness of one of the thickest usable media.

5. The media transportation mechanism control method described in claim 1, further comprising steps of:
    storing as a provisional media height the position where the media detection mechanism detects the media when the transportation arm descends in the media storage unit, and making a near-end decision for the number of remaining media stored in the media storage unit based on the provisional media height; and
    if the near-end decision determines the media supply is near the end, storing as the media height the position where the media detection mechanism stops detecting media as the transportation arm rises from the position where the media detection mechanism detected the media, and determining the number of remaining media by comparing this media height with the height threshold limit.

6. A control method for a media transportation mechanism having a transportation arm that can grip media stacked in a media storage unit and can move linearly, and a media detection mechanism that is positioned near the transportation arm and can detect if media is present, comprising steps of:
    lowering the transportation arm to the media storage unit;
    pausing the transportation arm when the media detection mechanism detects media;
    storing as the media height the position where the media detection mechanism stops detecting the media when the transportation arm rises; and
    comparing the media height with a height threshold limit, and determining a number of media remaining in the media storage unit based on a comparison of the media height with the height threshold limit.

7. The media transportation mechanism control method described in claim 6, wherein the determining step further comprises determining whether the number of media remaining in the media storage unit is a prescribed number, if the media height is less than the height threshold limit.

8. The media transportation mechanism control method described in claim 7, wherein the prescribed number of media is one.

9. The media transportation mechanism control method described in claim 6, wherein:
    the height threshold limit is set using a value that is less than the thickness of two of the thinnest usable media and is greater than the thickness of one of the thickest usable media.

10. The media transportation mechanism control method described in claim 6, further comprising steps of:
    storing as a provisional media height the position where the media detection mechanism detects the media when the transportation arm descends in the media storage unit, and making a near-end decision for the number of remaining media stored in the media storage unit based on the provisional media height; and
    if the near-end decision determines the media supply is near the end, storing as the media height the position where the media detection mechanism stops detecting media as the transportation arm rises from the position where the media detection mechanism detected the media, and determining the number of remaining media by comparing this media height with the height threshold limit.

11. A media processing device comprising:
    a media storage unit that stores media in a stack;
    a media processing unit that processes the media;
    a media transportation mechanism that has a media detection mechanism for detecting if media is present, and a transportation arm that can hold the media and travel linearly, and carries media from the media storage unit to the media processing unit by moving the transportation arm; and
    a control unit that lowers the transportation arm to the media storage unit, pauses the transportation arm when the media detection mechanism detects media, stores as the media height the position where the media detection mechanism stops detecting the media when the transportation arm rises, lowers the transportation arm again, grips the media in the media storage unit, and then raises the transportation arm, and compares the media height with a height threshold limit, and determines a number of media remaining in the media storage unit based on a comparison of the media height with the height threshold limit.

12. The media processing device described in claim 11, wherein the number of media remaining in the media storage unit is a prescribed number, if the media height is less than the height threshold limit.

13. The media processing device described in claim 12, wherein the prescribed number of media is zero.

14. The media processing device described in claim 11, wherein the media detection mechanism comprises:
   a detection lever that is supported freely movably on the transportation arm, and comprises a detection probe that can contact the media and can move between a media-not-detected position protruding to the media holding side from the transportation arm, and a media-detected position where the probe protrudes less than in the media-not-detected position; and
   a detector that detects displacement of the detection lever to the media-detected position.

15. A media processing device comprising:
   a media storage unit that stores media in a stack;
   a media processing unit that processes the media;
   a media transportation mechanism that has a media detection mechanism for detecting if media is present, and a transportation arm that can hold the media and travel linearly, and carries media from the media storage unit to the media processing unit by moving the transportation arm; and
   a control unit that lowers the transportation arm to the media storage unit, pauses the transportation arm when the media detection mechanism detects media, stores as the media height the position where the media detection mechanism stops detecting the media when the transportation arm rises, and compares the media height with a height threshold limit and determines a number of media remaining in the media storage unit based on a comparison of the media height with the height threshold limit.

16. The media processing device described in claim 15, wherein the number of media remaining in the media storage unit is a prescribed number, if the media height is less than the height threshold limit.

17. The media processing device described in claim 16, wherein the prescribed number of media is one.

18. The media processing device described in claim 15, wherein the media detection mechanism comprises:
   a detection lever that is supported freely movably on the transportation arm, and comprises a detection probe that can contact the media and can move between a media-not-detected position protruding to the media holding side from the transportation arm, and a media-detected position where the probe protrudes less than in the media-not-detected position; and
   a detector that detects displacement of the detection lever to the media-detected position.

\* \* \* \* \*